(12) United States Patent
Kondo et al.

(10) Patent No.: US 6,937,361 B1
(45) Date of Patent: Aug. 30, 2005

(54) IMAGE READING DEVICE AND METHOD OF THE SAME

(75) Inventors: Shin Kondo, Ebina (JP); Shunsuke Hamasuna, Ebina (JP); Kosuke Shimizu, Ebina (JP); Hiroshi Ishii, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 09/377,908

(22) Filed: Aug. 20, 1999

(30) Foreign Application Priority Data

| Aug. 31, 1998 | (JP) | ................................ 10-246285 |
| Jul. 9, 1999 | (JP) | ................................ 11-196632 |

(51) Int. Cl.[7] ........................ H04N 1/047; H04N 1/409
(52) U.S. Cl. ...................... 358/1.9; 358/3.26; 358/463; 358/486; 358/498
(58) Field of Search ................................ 358/1.9, 3.26, 358/463, 443, 474, 401, 496, 406, 486, 498; 382/275

(56) References Cited

U.S. PATENT DOCUMENTS

| 4,980,778 | A | * | 12/1990 | Wittman ..................... 358/446 |
| 5,241,404 | A | * | 8/1993 | Furukawa et al. ........... 358/466 |
| 5,267,059 | A | * | 11/1993 | Kawabata et al. ........... 358/498 |
| 6,445,469 | B1 | * | 9/2002 | Horiuchi et al. ............. 358/406 |
| 6,459,509 | B1 | * | 10/2002 | Maciey et al. ............... 358/474 |
| 6,515,774 | B2 | * | 2/2003 | Horiuchi et al. ............. 358/474 |
| 6,552,829 | B1 | * | 4/2003 | Maciey et al. ............... 358/486 |
| 2003/0174221 | A1 | * | 9/2003 | Tsuda ......................... 348/241 |
| 2004/0057616 | A1 | * | 3/2004 | Kondo et al. ............... 382/275 |

FOREIGN PATENT DOCUMENTS

| JP | 9-27910 | 1/1997 | .......... H04N 1/409 |
| JP | HEI. 9-139844 | 5/1997 | .......... H04N 1/409 |
| JP | 1997-139844 | 3/2001 | |
| JP | 1994-303428 | 3/2003 | |
| JP | 1994-046259 | 4/2003 | |
| JP | 1994-070099 | 4/2003 | |
| JP | 1994-086104 | 4/2003 | |
| JP | 2004221906 A | * 8/2004 | ............ H04N 1/19 |

* cited by examiner

Primary Examiner—Scott A. Rogers
(74) Attorney, Agent, or Firm—Morgan Lewis & Bockius LLP

(57) ABSTRACT

CCD1 as an image reading part reads a copy at the upstream and downstream of reading positions, and image data B and A at each of the reading positions are obtained from an output delay circuit and a shading correction circuit, respectively. A streak detector 8 compares the image data A with B, and outputs black streak detecting data indicating that the image data A contains black streaky noises, when the image data is not coincident in succession as to a plurality of pixels arrayed in the sub-scanning direction. A streak eliminator normally outputs the image data A, but it outputs the image data B instead of the image data A with regard to the pixels from which the black streak detecting data containing the noise is outputted. The image data reading device of present invention being thus constructed, the device is able to accurately detect streaky noises by adhesion of thrashes to the reading unit, even if there are speed variations in the copy feeding.

19 Claims, 23 Drawing Sheets

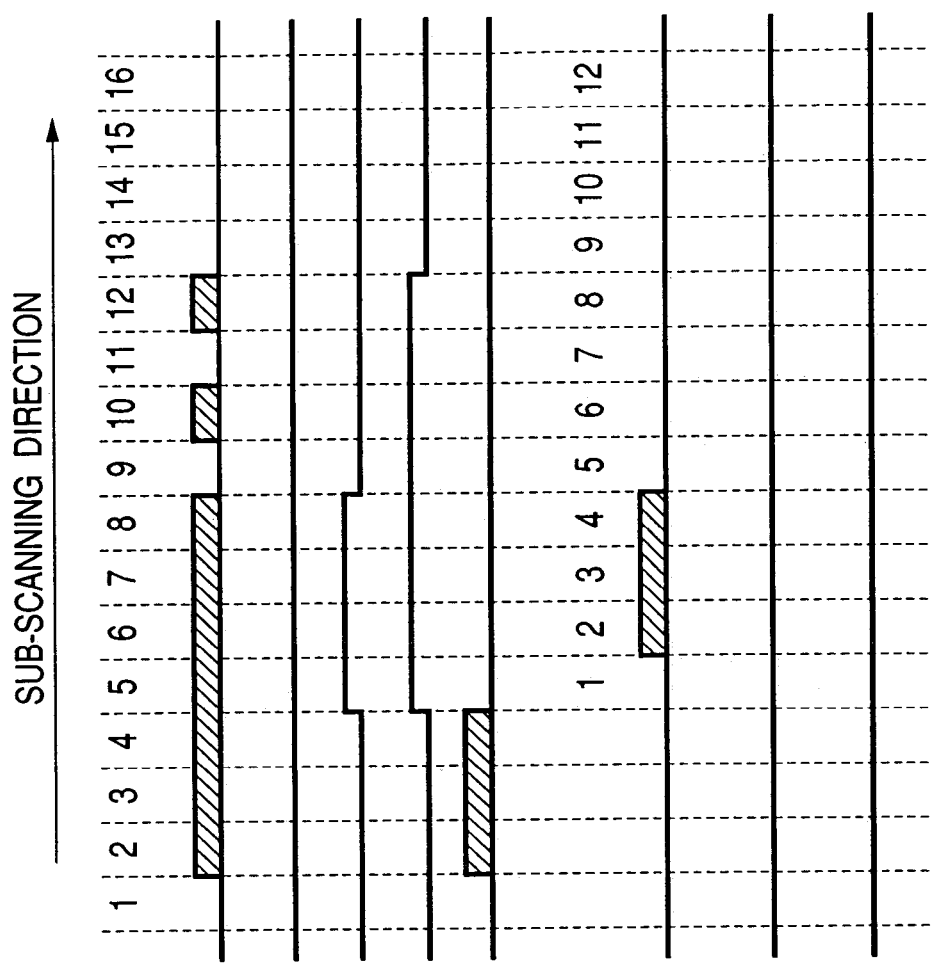

IMAGE DATA BEFORE ELIMINATING BLACK STREAKS

IMAGE DATA AFTER ELIMINATING BLACK STREAKS

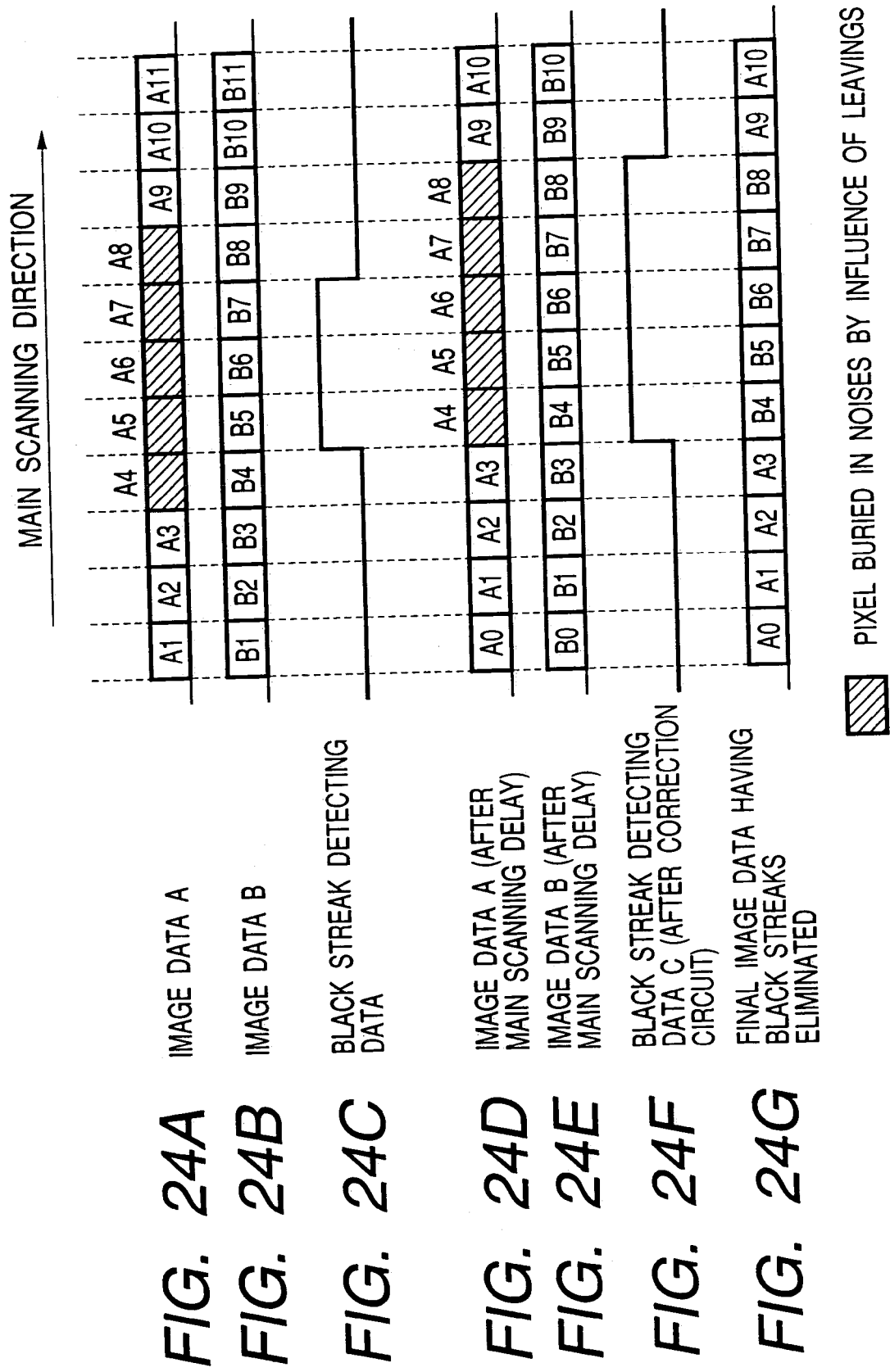

IMAGE READING DEVICE AND METHOD OF THE SAME

DETAILED DESCRIPTION OF THE INVENTION

1. Field of the Invention

The present invention relates to a device for reading images in digital copy machines, facsimiles, image scanners, and the like, and a method for the same.

2. Related Art

Various image reading devices such as digital copy machines, facsimiles, image scanners, and the like are available which read copies carried by the feeder at a specific read position. In these image reading devices, leavings can adhere to the reading units. When an image reading device reads images in such a case, the reading unit thereof can read leavings thereon. Accordingly, the output images or sending images (hereunder, simply called as output images) obtained from the image reading device can have streaks generated extending in the sub-scanning direction, which are not present on the copy images.

As a means to solve this problem, various methods are proposed which apply a processing to prevent leavings, etc., from adhering to the surface of the contact glass of the reading unit, or set the position of the reading unit to a place that can pick up less leavings. However, these methods are unable to solve a malfunction appearing in case of leavings happening to adhere to the reading unit, namely, the malfunction that streaks appear on the output images by adhesion of leavings.

Accordingly, a technique is proposed in the Japanese Published Unexamined Patent Application No. Hei 9-139844, which prevents the influence of leavings from appearing on the output images when leavings adhere to the reading unit.

The image reading device disclosed in the foregoing application may be summarized as follows. First, this image reading device reads a copy now being fed at two reading positions slightly detached along the copy feeding direction. Hereunder, for the purpose of conveniences, the reading position that the copy now being fed first passes through is called the upstream reading position, and the reading position that the copy secondly passes through is called the downstream reading position.

When images are read from a copy at two positions of the upstream reading position and the downstream reading position, the image data items on the main scanning lines are obtained at the upstream reading position, which are arrayed along the sub-scanning direction in a series as, for example, Pk, Pk+1, Pk+2, pk+3, . . .

On the other hand, at the downstream reading position, the image data items having the phase delayed by, for example, d lines compared to these image data items, Pk+d, Pk+d+1, Pk+d+2, pk+d+3, . . . are obtained. Here in this case, the suffixes in the image data Pk, etc., signifies the numbers of the main scanning lines.

Assuming that leavings are adhered to a position on the contact glass corresponding to the downstream reading position, the upstream reading position can pick up images with fidelity to the copy images, however, the downstream reading position can pick up images influenced by the leavings, which creates a difference between both of the image data.

Accordingly, this image reading device applies a delay equivalent to the foregoing phase delay d to the image data at the upstream reading position to generate image data in phase with the image data at the downstream reading position, compares the image data with the image data at the downstream reading position, and if there is a difference between both, determines that leavings are adhered to the downstream reading position.

In this case, a part of the image data at the downstream reading position that is different from the image data at the upstream reading position can be regarded as the image data of a part influenced by leavings. Accordingly, this image reading device removes streaks appearing on the output images by replacing the image data of a part influenced by leavings with fixed mask data.

However, the technique disclosed in the foregoing Application No. Hei 9-139844 is materialized on the assumption that the copy feeding speed is constant. However, in the actual copy feeder of the image reading device, the copy feeding speed will vary when the copy rushes into the feeding roller, or when the copy ejects out of the feeding roller. On the other hand, the phase difference between the image data at the upstream reading position and the image data at the downstream reading position is determined by the distance between the upstream and downstream reading positions and the copy feeding speed. Accordingly, if the copy feeding speed varies, the phase difference d between the image data at the upstream reading position and the image data at the downstream reading position will vary. Thus, if the delay equivalent to the phase difference d is applied to the former image data, it will be different from the latter image data; and even if there are not actually any leavings thereon, the determination will be made as if leavings are adhered thereto.

Further, in the construction disclosed in the foregoing Application No. Hei 9-139844, the image data influenced by leavings is replaced by the fixed mask data, whereby streaks on the output images are removed. However, this method creates a concentration difference between the images corresponding to the mask data and the surrounding images of the said images, and thereby deteriorates the output images or the sending images, which is another problem.

SUMMARY OF THE INVENTION

The present invention has been made in view of the aforementioned circumstances, and it is therefore an object of present invention to provide a device and method for reading images that are able to accurately detect streaky noises due to adhesion of leavings or the like to the reading unit, even under the condition of speed variations in the copy feeding, and to remove the streaky noises from the output images.

The present invention provides an image reading device including a feeding part that feeds a copy, a plurality of reading parts that read the copy fed by the feeding part, and a noise detecting part that, when comparing image data outputted by the plurality of reading parts and detecting that a specific number of pixels of the image data are not coincident as to a plurality of pixels arrayed in the sub-scanning direction, determines that the image data outputted by a specific reading part of the plurality of reading parts contains streaky noises.

According to this image reading device, streaky noises can accurately be detected, even if there are speed variations in the copy feeding.

Further, the present invention provides an image reading device including a feeding part that feeds a copy, a plurality of reading parts that read the copy fed by the feeding part, a noise detecting part that compares image data outputted by the plurality of the reading parts, and on the basis of the comparison result, determines whether or not the image data outputted by the reading part for generating output images selected among the plurality of reading parts contains noises, a noise eliminating part that conducts, on the basis of the determination result by the noise detecting part, noise eliminating processing to the image data outputted by the reading part for generating output images, and a switch part that switches the reading part for generating output images into another reading part than the current one, when the noise detecting part determines that the image data contains noises during reading of the copy.

According to the image reading device thus constructed, if noises are detected from the image data outputted by the reading part for generating output images, since the reading part for generating output images is changed from the current one into another one, the output images not including noises due to adhesion of leavings can be formed.

Furthermore, the present invention provides an image reading device including a feeding part that feeds a copy, a plurality of reading parts that read the copy fed by the feeding part, a noise detecting part that compares image data outputted by the plurality of reading parts, and determines whether or not the image data read by the plurality of reading parts contains noises depending on whether or not inconsistencies of the image data are detected in succession as to a plurality of pixels arrayed in the sub-scanning direction, a noise eliminating part that conducts, on the basis of the determine result by the noise detecting part, noise eliminating processing to the image data read by a reading part selected as the reading part for generating output images among the plurality of reading parts, a noise quantity measuring part that measures, on the basis of the determination result by the noise detecting part, the quantity of noises for one main scanning line as to each of the plurality of reading parts, and a switch part that switches the reading part for generating output images into a reading part having the smallest quantity of noises measured by the noise quantity measuring part.

According to the image reading device thus constructed, even if each of the image data obtained by a plurality of reading parts contains noises, the image data with less noises is selected, the noises are removed from them, and thereby good output images can be formed.

Furthermore, the present invention provides an image reading device including a feeding part that feeds a copy, a plurality of reading parts that read the copy fed by the feeding part, a noise detecting part that compares image data items outputted by the plurality of reading parts, and determines whether or not the image data items read by the plurality of reading parts contain noises depending on whether or not inconsistencies of the image data items are detected in succession as to a plurality of pixels arrayed in the sub-scanning direction, a noise eliminating part that conducts, on the basis of the determination result by the noise detecting part, noise eliminating processing to the image read by a reading part selected as the reading part for generating output images among a plurality of the reading parts. Further, the noise eliminating part applies the same process as that of the specific eliminating part in the sub-scanning direction with a plurality of lines in succession even after the noises are determined to be contained.

According to the image reading device thus constructed, a high quality output image can be acquired without the streaky noises left in a dotted line even when the density of the streaky noises is low, with the streaky noises eliminated.

Furthermore, the present invention provides an image reading device including a feeding part that feeds a copy, a plurality of reading parts that read the copy fed by the feeding part, a noise detecting part that compares image data items outputted by a plurality of the reading parts, and determines whether or not the image data items read by a plurality of the reading parts contain noises depending on whether or not inconsistencies of the image data items are detected in succession as to a plurality of pixels arrayed in the sub-scanning direction, a noise eliminating part that conducts, on the basis of the determination result by the noise detecting part, noise eliminating processing to the image data read by a reading part selected as the reading part for generating output images among a plurality of the reading parts. Further, the noise eliminating part applies the same process as that of the specific eliminating part to a plurality of adjoining pixels in the main scanning direction of the pixels that are determined to contain the noises.

According to the image processing device thus constructed, even when there are the streaky noises affected by a large width of leavings in the main scanning direction, the noises on both ends will not be left in a dotted line, and a high quality output image with the streaky noises eliminated can be acquired.

BRIEF DESCRIPTION OF THE DRAWINGS

FIGS. 20–20H are charts to explain the operation of the streak eliminator in the same embodiment;

FIGS. 24A–24G are chart to explain the operation of the streak eliminator in the same embodiment.

DETAILED DESCRIPTION OF THE INVENTION

Description of the Embodiments

The embodiments of present invention will now be described with reference to the accompanying drawings.

A. First Embodiment

Figure 1:
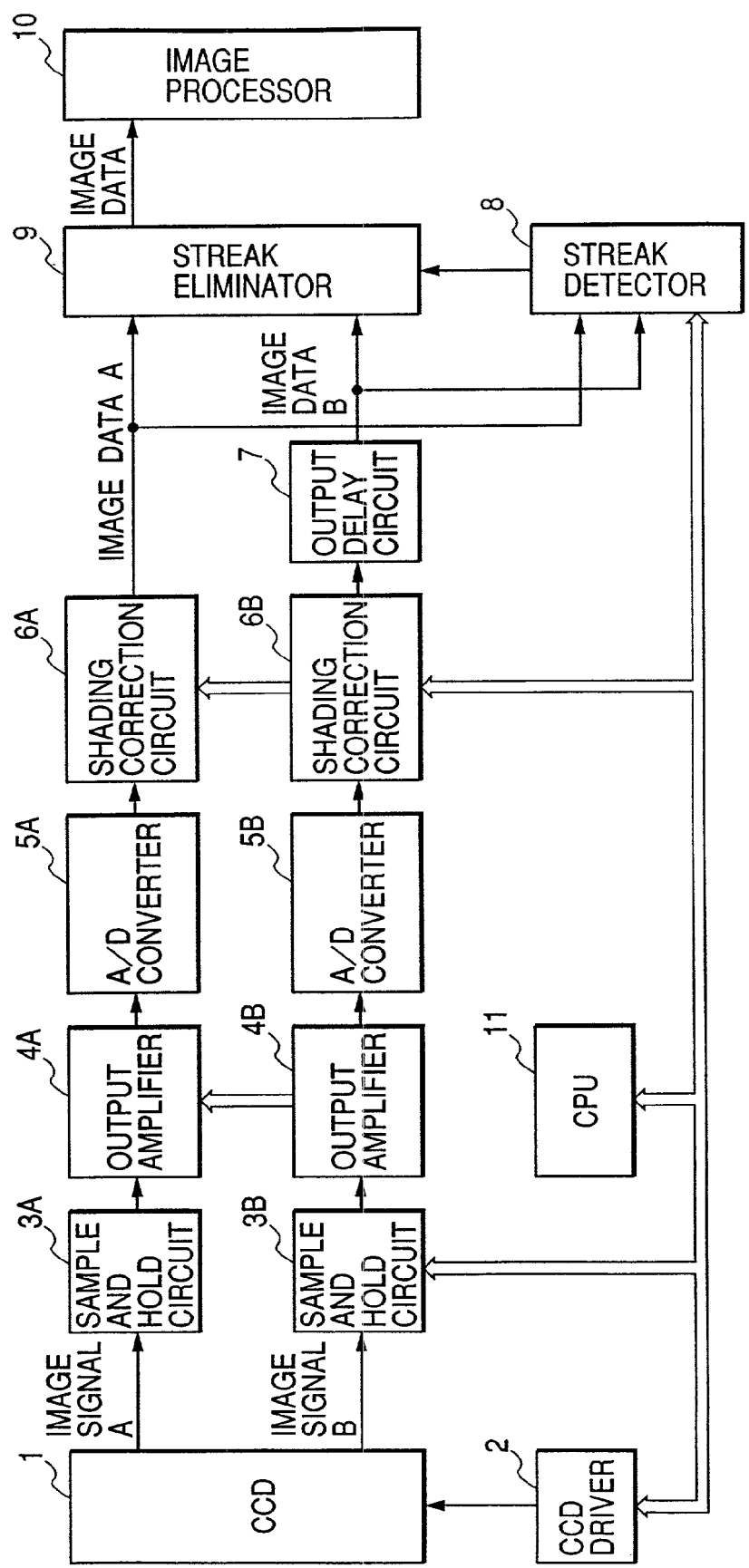
FIG. 1 is a block diagram to illustrate a construction of the image reading device relating to the first embodiment of present invention.

FIG. 1 is a block diagram to illustrate the construction of an image reading device relating to the first embodiment of present invention. In FIG. 1, a CCD1 is a part that reads a copy fed by a copy feeder not illustrated. In this embodiment, the CCD1 reads copy images at both of the upstream reading position and the downstream reading position on the copy feeding path, and outputs an analog image signal A read at the downstream reading position and an analog image signal B read at the upstream reading position.

Figure 2:
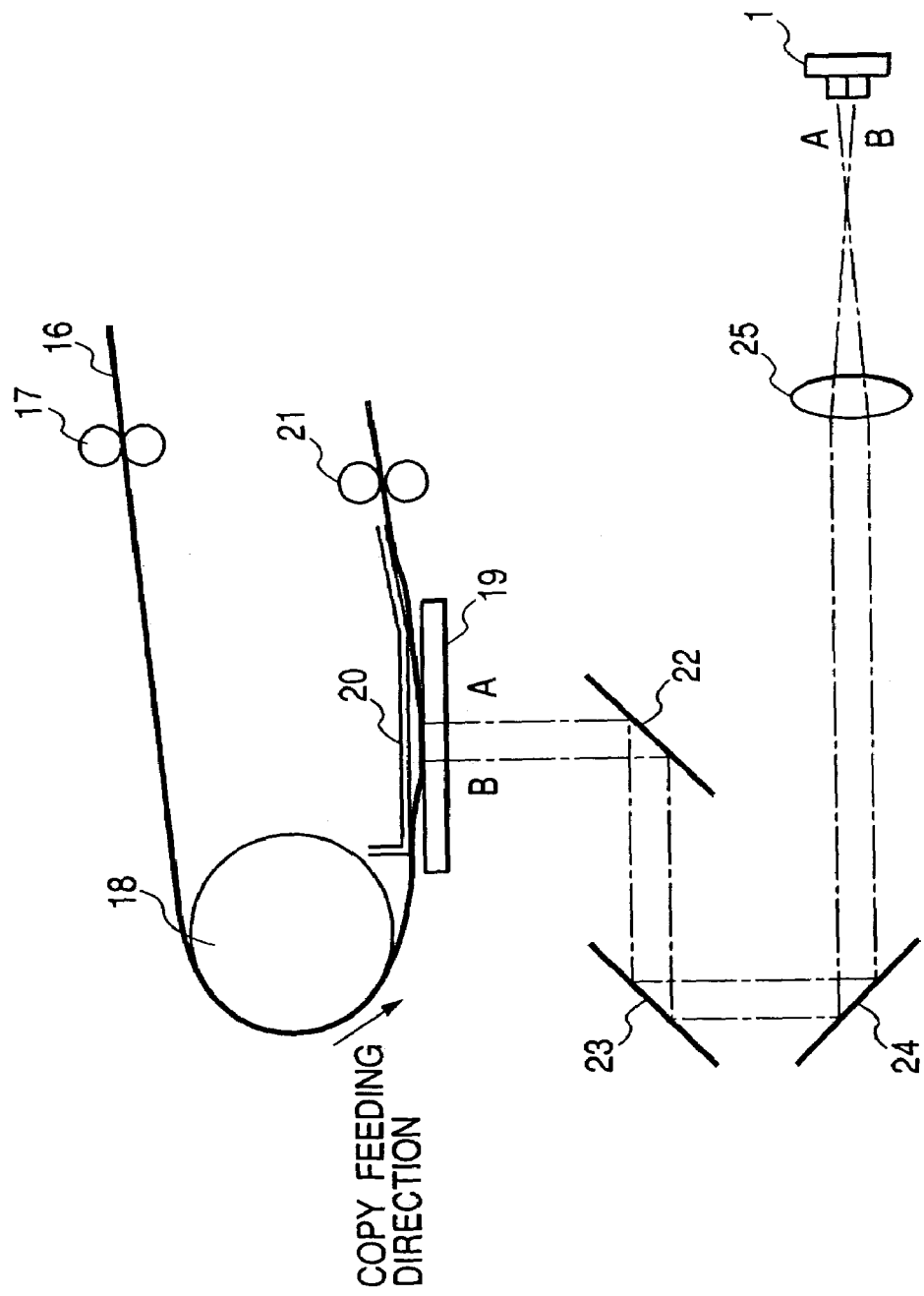
FIG. 2 is a chart to illustrate a copy feeding device and an optical system for reading a copy in the first embodiment.

FIG. 2 illustrates the construction of the copy feeder and the construction of an optical system from the reading position on the copy feeding path to the CCD1. In FIG. 2, a copy 16 is carried one by one to a feeding roller 18 by a lead-in roller 17. The feeding roller 18 changes the copy feeding direction and carries the copy 16 to a contact glass 19. And, the copy 16 is pressed to the contact glass 19 by a back platen 20, and is ejected out of the feeder by an ejection roller 21. The foregoing upstream reading position and downstream reading position are each provided on the contact glass 19. The optical path of the copy images at these reading positions is changed by a first mirror 22, a second mirror 23, and a third mirror 24, and the copy images are reduced by a lens 25 to go into the CCD1.

Figure 3:
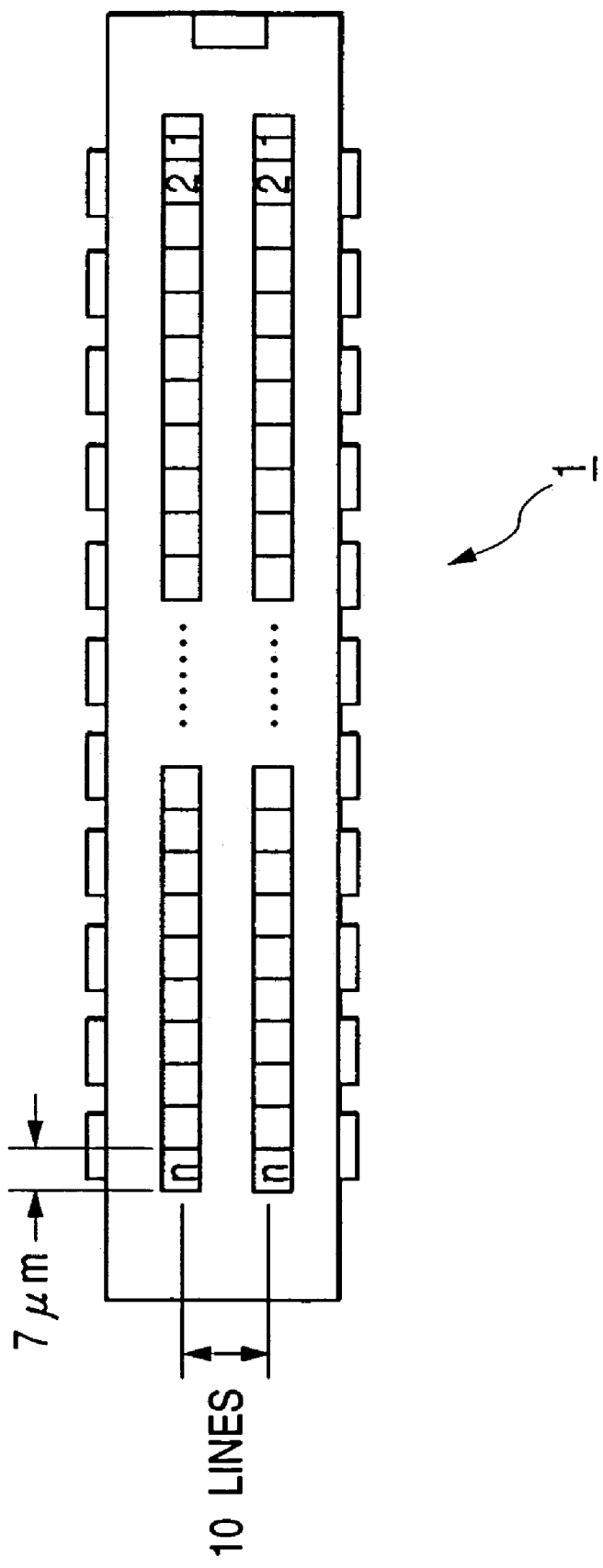
FIG. 3 is a chart to illustrate a construction of a CCD in the first embodiment.

As shown in FIG. 3, in the package of this CCD1 are formed two rows of line sensors, in each of which are arrayed N pieces of photo diodes having the size of 7 $\mu$mm×7 $\mu$mm. These line sensors are the parts that read the copy images at each of the upstream and downstream reading positions. Here, the line sensors are placed with a gap of 70 $\mu$mm to each other. In contrast to this, the upstream reading position and the downstream reading position on the copy feeding path are detached with a distance of 423 $\mu$mm. The copy images at these reading positions (each line image for each one line) are reduced accompanied with the passing of the optical system shown in FIG. 2 to form the images on each of the line sensors.

The line sensor corresponding to the downstream reading position sequentially detects currents flowing through n pieces of photo transistors that constitute the concerned line sensor for each line period (main scanning period), and outputs the analog image signal A to present the concentration of pixels for one line (n pixels). In the same manner, the line sensor corresponding to the upstream reading position sequentially detects currents flowing through n pieces of photo transistors for each line period (main scanning period), and outputs the analog image signal B to present the concentration of pixels for one line (n pixels).

Here, the gap 70 $\mu$mm between the line sensors corresponding to the upstream and downstream reading positions corresponds to the gap for 10 scanning lines. Therefore, if there is not a speed variation in the copy feeding, the analog image signal A will have a phase delay equivalent to 10 lines against the analog signal B.

In FIG. 1, on the subsequent stage of the CCD1 are provided a signal processing system including a sample and hold circuit 3A, an output amplifier 4A, an A/D converter 5A, and a shading correction circuit 6A, and a signal processing system including a sample and hold circuit 3B, an output amplifier 4B, an A/D converter 5B, and a shading correction circuit 6B. The former is the signal processing system corresponding to the image signal A at the downstream reading position, and the latter is the signal processing system corresponding to the image signal B at the upstream reading position.

The analog image signals A and B obtained from the CCD1 are each sampled by the sample and hold circuits 3A and 3B, each amplified to appropriate levels by the output amplifiers 4A and 4B, and each converted into digital image data A and B by the A/D converters 5A and 5B. To these digital image data A and B, the shading correction circuits 6A and 6B apply the corrections corresponding to the sensitivity dispersion of the CCD1 and the light quantity distribution characteristic of the optical system. The signal processing systems corresponding to the image signals A and B have been summarized.

The output delay circuit 7 delays the image data B outputted from the shading correction circuit 6B by a delay time equivalent to 10 lines, and outputs the delayed image data B in phase with the image data A. The streak detector 8 compares the image data A outputted from the shading circuit 6A and the image data B outputted from the output delay circuit 7, thereby detects black streaky noises contained in the image data A, and outputs black streak detecting data. Further, the streak eliminator 9 generates image data in which the black streaky noises are removed from the image data A, on the basis of the black streak detecting data from the streak detector 8, and outputs the result to the image processor 10. The streak detector 8 and the streak eliminator 9 will be detailed later.

The image processor 10 performs the image processing, for example, expansion and reduction processing, skin removal processing, binary processing, and the like, required by a device (digital facsimile, scanner or the like) into which this image reading device is incorporated.

The CPU11 is a part that controls the units in this image reading device. Concretely, the CPU11 sets the period of the CCD1 driving that the CCD driver 2 executes, and controls the gains of the output amplifiers 4A and 4B, the shading correction circuits 6A and 6B, and the constant (mentioned later) of the streak detector 8, etc.

The total construction of the image reading device relating to this embodiment has been outlined.

Next, referring to FIG. 4, the streak detector 8 will be described. The streak detector 8 in this embodiment is comprised of a data comparison block 27 and a continuity detection block 28.

The data comparison block 27 is supplied with the image data A and B each representing the concentrations of n pixels for each line period (main scanning period). The image data B is correspondent with the copy image read at the upstream reading position, and it is delayed for as much as 10 lines by the output delay circuit 7. Therefore, if there is not a variation in the copy feeding speed, the image data A and B inputted to the data comparison block 27 represent the read images each corresponding to one and the same line on the copy, and both should be coincident with each other in itself. However, if leavings are adhered to the downstream reading position, of the image data A corresponding to the downstream reading position, the image data of the pixels corresponding to the position where the leavings are adhered is influenced by adhesion of the leavings, and the concentration of the concerned pixels represented by the image data A can be considered to become remarkably higher than the concentration of the concerned pixels represented by the image data B. Accordingly, on the basis of such a premise, this data comparison block 27 generates a signal indicating that the image data A can be influenced by leavings when the image data A is much higher in the concentration than the image data B. Further details will be as follows.

The comparator 29 in this data comparison block 27 compares the image data A and the image data B, outputs the signal "1" if the former is larger than the latter, and outputs "0" if otherwise. The subtracter 30 subtracts the image data B from the image data A, and outputs the difference A-B between the image data A and B. The comparator 31 compares the difference A-B obtained by the subtracter 30 to a specific threshold level, and outputs "1" if the difference A-B is higher than the threshold level, and outputs "0" if otherwise. The AND circuit 32 receives the output signal from the comparator 29 and the output signal from the comparator 31, and outputs the logical product by both. That is, if the concentration of pixels corresponding to the image data A is higher than the concentration of pixels corresponding to the image data B, and if the concentration difference between both of the pixels is higher than the specific threshold level, the AND circuit 32 outputs "1", and outputs "0" if otherwise. Incidentally, for the purpose of conveniences, the output signal from the AND circuit 32 will hereunder be called as leavings determination bits.

As already described, the data comparison block 27 receives the image data A and B each for one line (n pixels) by each line period. The data comparison block 27 performs the foregoing processing to each of the pixels constituting one line, and outputs serial data of n bits formed of the leavings determination bits that represent for each pixel whether or not the image data A is influenced by leavings by each line period from the AND circuit 32.

When the copy feeding speed is constant, the determination of black streaks appearing on the output images can be made on the condition that this leavings determination bits become "1". However, since the copy feeding speed varies, the determination can immediately be made such that black streaks have appeared on the output images, even though the leavings determination bits became "1". This will be described referring to FIG. 5.

Figure 5:
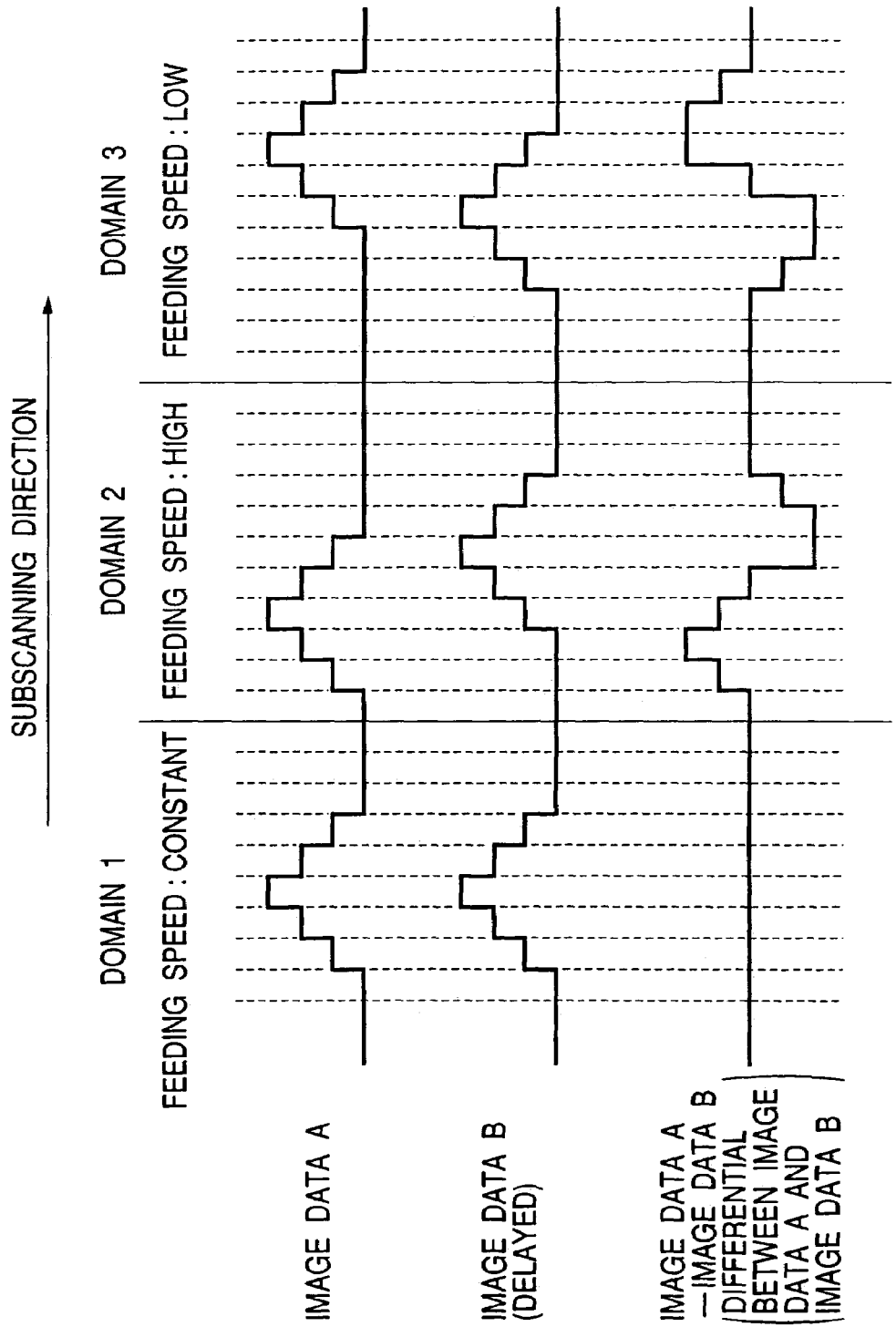
FIG. 5 is a chart to explain the operation of the streak detector.

FIG. 5 illustrates the waveforms of the image data A and B inputted during the sub-scanning period to the data comparison block 27 and the output signal of the subtracter 30. In the drawing, there are many dotted lines in the vertical direction, which indicate the switching timings of the main scanning lines. And, for easier understanding, the waveforms of the image data and the output signal of the subtracter 30 are depicted in correspondence with the pixels whose positions in the main scanning direction are identical.

In FIG. 5, on the domain 1 in the sub-scanning period, since the copy is carried at a normal feeding speed, the data comparison block 27 receives the image data A and the delayed image data B in phase with the image data A. Therefore, in this case, the output signal from the subtracter 30 becomes zero level.

Next, on the domain 2 in the sub-scanning period, the copy is carried at a higher speed than the normal feeding speed. Therefore, the delay time from the moment when the copy passes through the upstream reading position to the moment when the copy arrives at the downstream reading position becomes shorter than the delay time of the output delay circuit 7; and therefore, the image data A leads in phase against the image data B. Thus, the output signal of the subtracter 30 is undulated, as illustrated.

Next, on the domain 3 in the sub-scanning period, the copy is carried at a lower speed than the normal feeding speed. Therefore, the delay time from the moment when the copy passes through the upstream reading position to the moment when the copy arrives at the downstream reading position becomes longer than the delay time of the output delay circuit 7; and therefore, the image data A lags in phase against the image data B. Also in this case, the output signal of the subtracter 30 is undulated, as illustrated.

Thus, even though the image data A and B are not influenced by leavings and the waveforms themselves are not disturbed, if a phase difference is generated between both, only the phase difference will disturb the waveform of the output signal from the subtracter 30. And, if the output signal from the subtracter 30 exceeds the threshold level, and at that moment, if the image data A is higher than the image data B, the leavings determination bits will become "1". In this manner, the leavings determination bits can become "1" depending on variations of the copy feeding speed. Therefore, it is impossible to immediately determine that black streaks have appeared on the output images, even though the leavings determination bits became "1".

Incidentally, since the variation of the copy feeding speed occurs when the copy hits the roller or leaves the roller, the phase shift between the image data A and B based on the variation of the copy feeding speed can be considered to continue only for two- to three-line periods. The number of lines at which this phase shift occurs varies in accordance with the copy feeding speed that changes according to the rotational irregularity of a motor, or the reading scale factor, etc. On the other hand, the generation of black streaks by adhesion of leavings will continue at least more than several ten-line periods. Therefore, when the leavings determination bits corresponding to a specific pixel maintain "1" continuously over 5- to 10-line periods, it is conceivable that such circumstances are created not due to influence by the speed variation in the copy feeding, but due to adhesion of leavings. However, as mentioned above, since the number of lines at which the phase shift occurs increases as the copy feeding speed becomes faster, it is designed so that the continuing number of the leavings determination bits can be set according to the copy feeding speed in order to accurately determine whether the phase shift results from adhesion of leavings. For example, the continuing number of the leavings determination bits is needed to be set to a larger value as the copy feeding speed becomes faster, or the continuing number of the leavings determination bits is needed to be set according to the pixel numbers of noises generated when the copy feeding speed is fast, or needed to be set according to the amount of the phase shift of the image data A and B that occurs when the copy feeding speed is fast.

Figure 4:
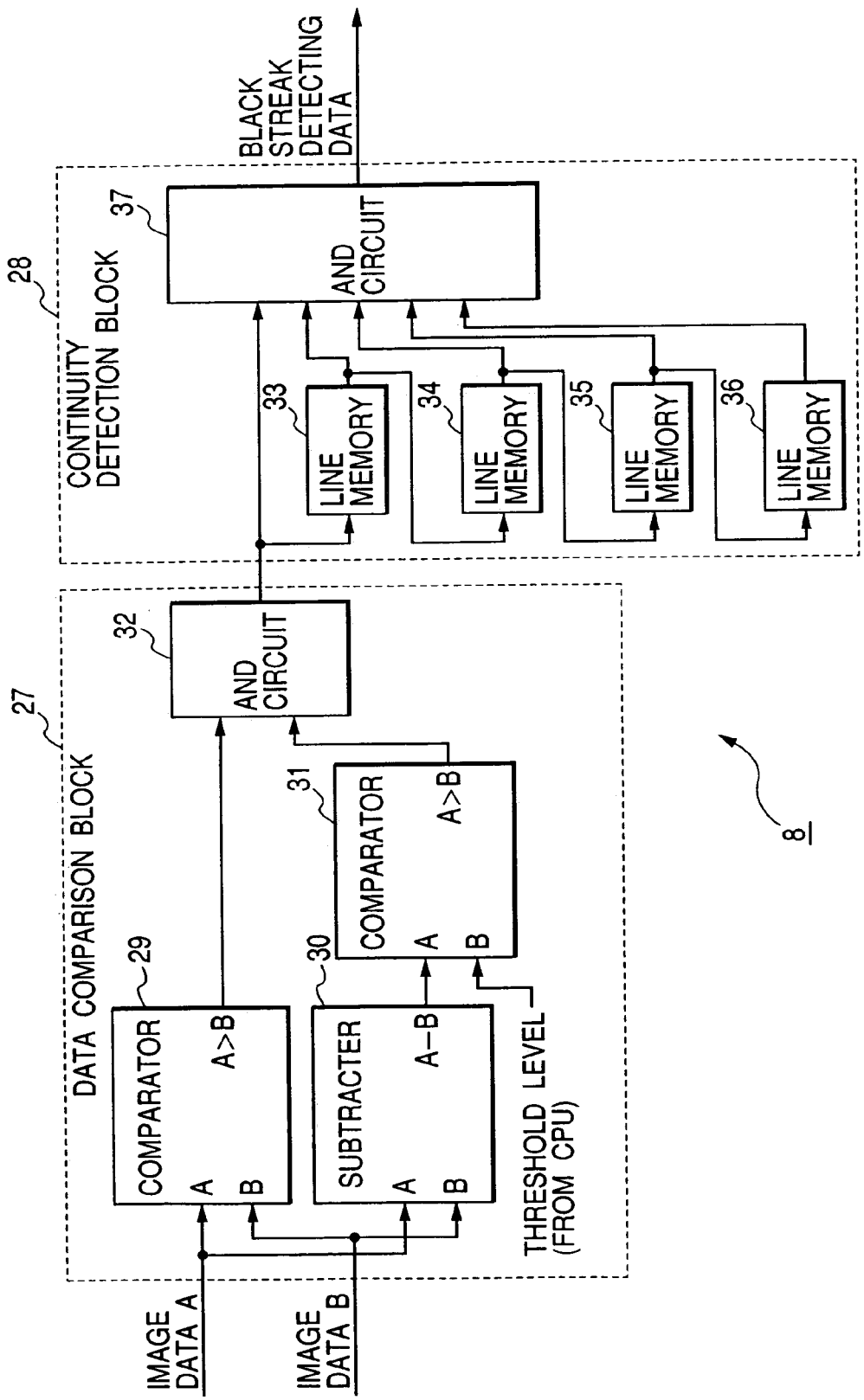
FIG. 4 is a block diagram to illustrate a construction of a streak detector in the first embodiment.

The continuity detection block 28 in FIG. 4 is based on this concept, which is provided on the subsequent stage of the data comparison block 27. The continuity detection block 28 comprises four line memories 33 to 36, and an AND circuit 37. Here, the line memories 33 to 36 are each made up with FIFO (First-In First-Out) memories. These line memories are cascaded as illustrated, which constitute one shift register that sequentially shifts the leavings determination bits outputted from the foregoing data comparison block 27. Further, each line memory is made so as to memorize n-bit serial data, and data inputted to each line memory is outputted from the concerned line memory after one-line period.

Accordingly, when the leavings determination bits corresponding to a certain pixel are outputted from the AND circuit 32 of the data comparison block 27, the leavings determination bits corresponding to the previous pixels for one to four lines each against the concerned pixel are outputted from the line memories 33 to 36. The AND circuit 37 outputs the signal "1" when all the leavings determination bits outputted from the AND circuit 32 of the data comparison block 27 and the line memories 33 to 36 are "1", namely, when the pixels having an identical position in the main scanning direction are determined continuously for five lines as being influenced by leavings; and it outputs "0" if otherwise. The output signal from this AND circuit 37 is defined as black streak detecting data.

Figure 6:
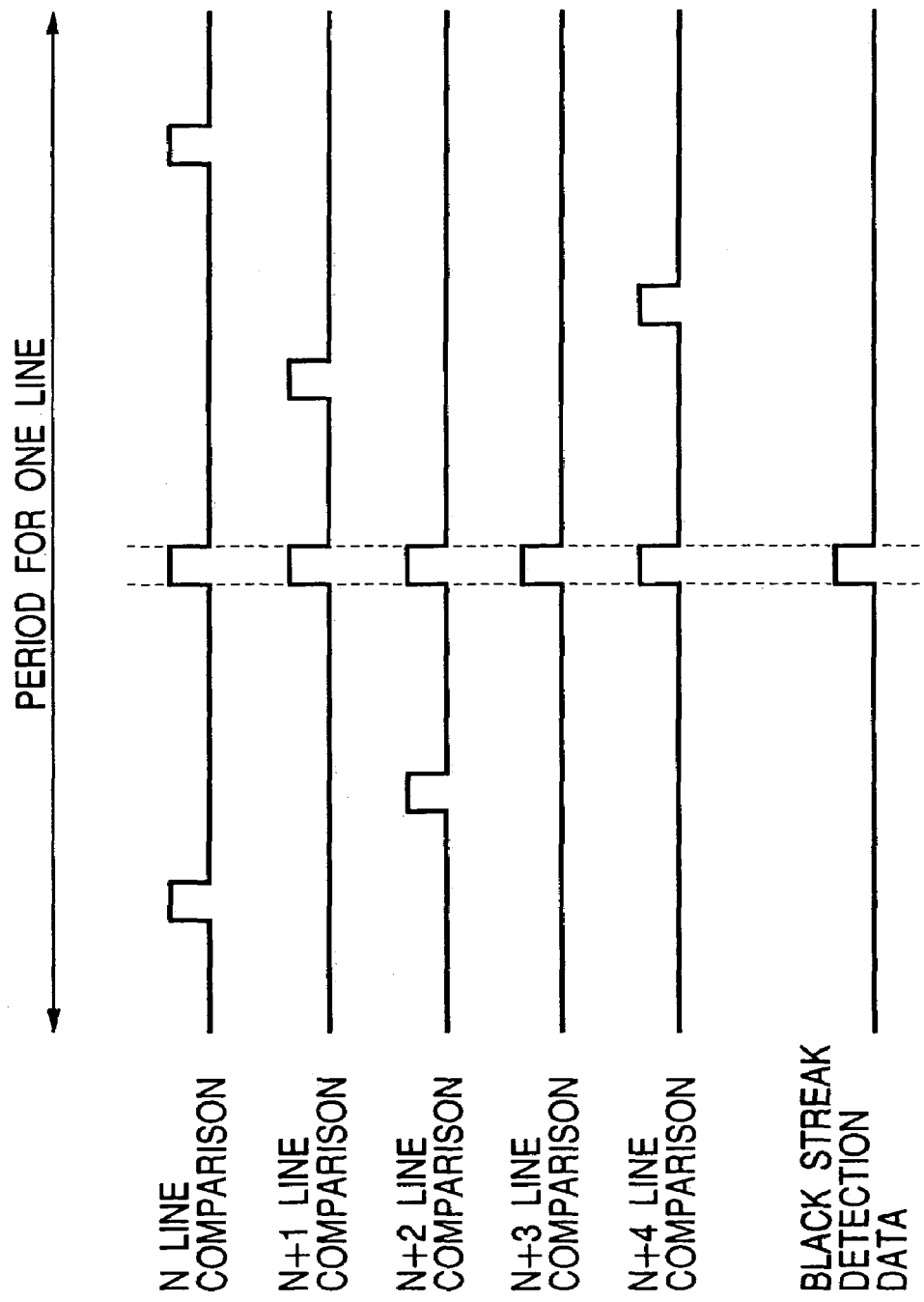
FIG. 6 is a chart to explain the operation of the streak detector.

FIG. 6 is a timing chart to illustrate the operation of the continuity detection block 28 mentioned above. In the drawing, "N line comparison" illustrates the leavings determination bits outputted from the line memory 36, "N+1 line comparison" illustrates the leavings determination bits outputted from the line memory 35, "N+2 line comparison" illustrates the leavings determination bits outputted from the line memory 34, "N+3 line comparison" illustrates the leavings determination bits outputted from the line memory 33, and "N+4 line comparison" illustrates the leavings determination bits outputted from the data comparison block 27. As shown in FIG. 6, when the leavings determination bits become "1" continuously for five lines as for the pixels having an identical position in the main scanning direction, the black streak detecting data becomes "1".

Figure 7:
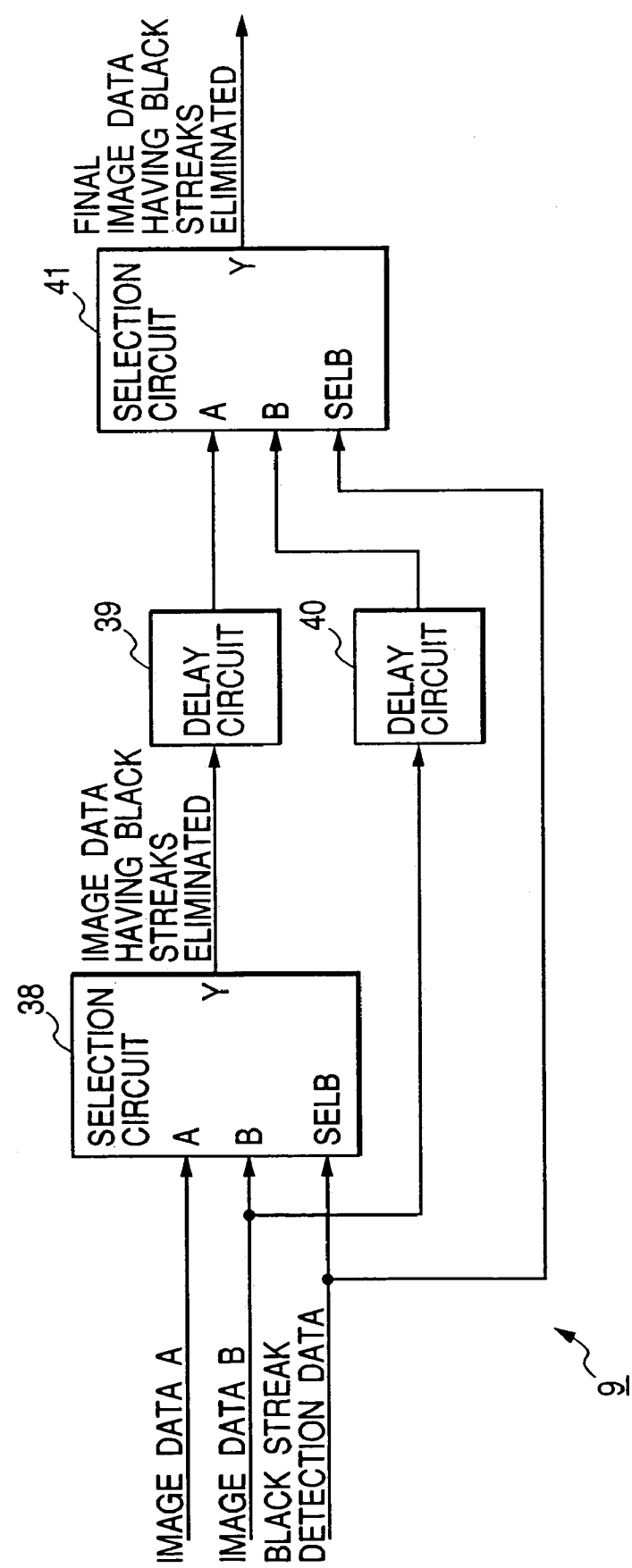
FIG. 7 is a block diagram to illustrate a construction of a streak eliminator in the first embodiment.

Referring to FIG. 7, the construction of the streak eliminator 9 will be described. As shown in FIG. 7, the streak eliminator 9 is comprised of a selection circuit 38, delay circuits 39 and 40, and selection circuit 41.

The selection circuit 38 selects the image data A from the shading correction circuit 6A when the black streak detecting data outputted from the streak detector 8 is "0", and selects the image data B from the output delay circuit 7 when the black streak detecting data is "1"; thus, it outputs the selected data as image data having black streaks eliminated. The delay circuit 39 outputs to delay for four-line periods the image data having black streaks eliminated from the selection circuit 38. The delay circuit 40 outputs to delay the image data B from the output delay circuit 7 for four-line periods. The selection circuit 41 selects the image data having black streaks eliminated from the delay circuit 39 when the black streak detecting data outputted from the streak detector 8 is "0", and selects the image data B from the delay circuit 40 when the black streak detecting data is "1"; thus, it outputs the selected data as final image data having black streaks eliminated.

In short, the streak eliminator 9 outputs the image data A as it is, when the black streak detecting data is "0"; however, it outputs the image data B instead of the image data A retroactively to four-line periods, when the black streak detecting data is "1" and the use of the image data A finds that black streaks appear on the output images. The reason to switch the image data retroactively to four-line periods lies in that the timing of the black streak detecting data switching from "0" to "1", lags for four-line periods against the timing of the black streaks appearing on the output images. The delay circuits 39 and 40, and the selection circuit 41 are added on the subsequent stage of the selection circuit 38 in order to switch the image data retroactively to four-line periods.

Figure 8:
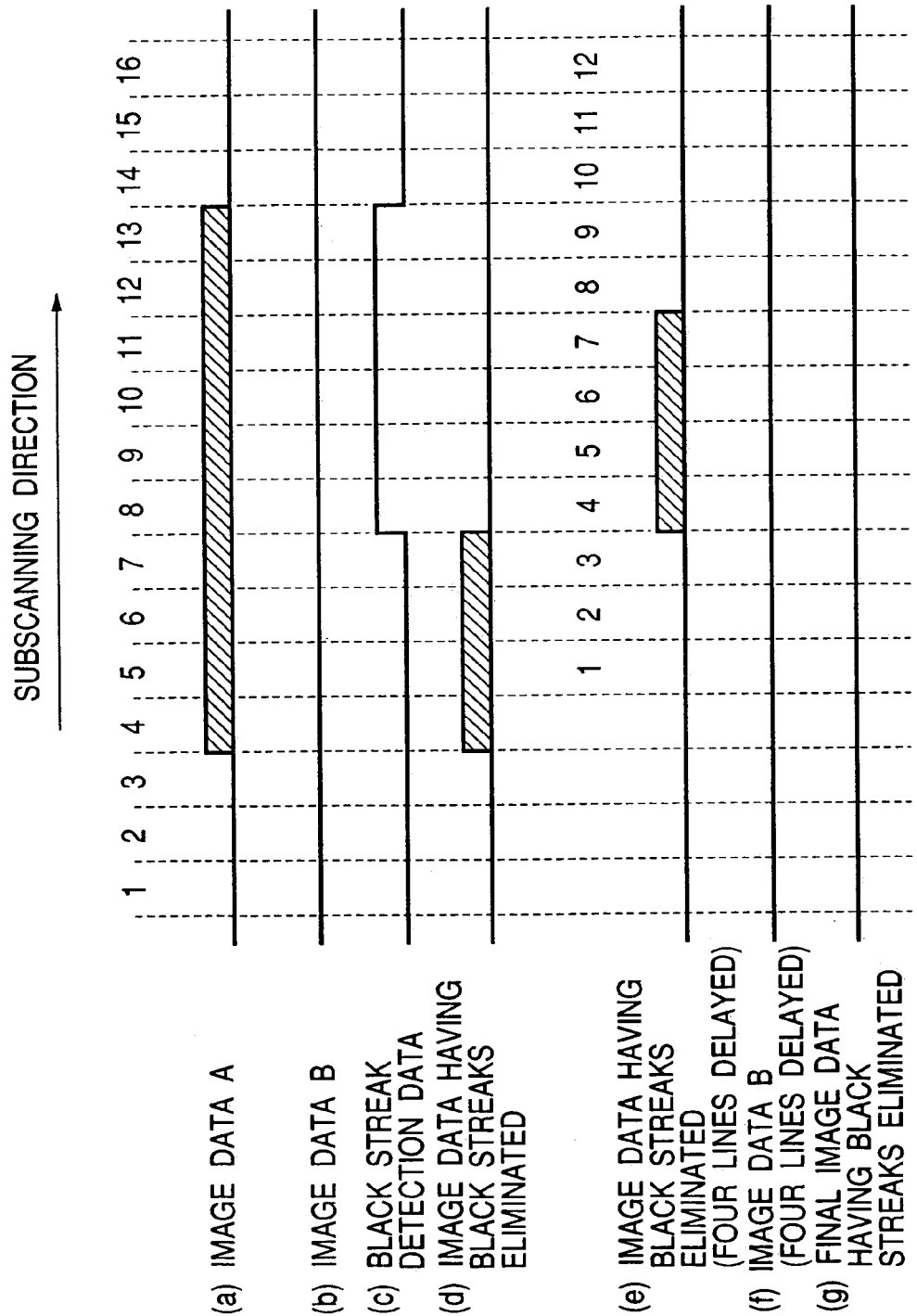
FIG. 8 is a chart to explain the operation of the streak eliminator.

FIG. 8 illustrates an operation example of the streak eliminator 9 described above. FIG. 8A and FIG. 8B illustrate the image data A and B corresponding to a specific pixel (both are the image data inputted to the streak eliminator 9). In this example, the image data A is influenced by adhesion of leavings over 4- to 13-line periods, during which the leavings determination bits corresponding to the concerned pixel become "1". And, the black streak detecting data becomes "1" after four-line periods from when the leavings determination bits first become "1". Therefore, as shown in FIG. 8C, the black streak detecting data becomes "1" during 8- to 13-line periods. Accordingly, as shown in FIG. 8D, during 4- to 7-line periods, the image data A influenced by adhesion of leavings is selected by the selection circuit 38; and during 8- to 13-line periods, the image data B not influenced by adhesion of leavings is selected, which is outputted as the image data having black streaks eliminated.

The image data having black streaks eliminated is delayed for four-line periods by the delay circuit 39. The image data B is delayed for four-line periods by the delay circuit 40. FIG. 8E and FIG. 8F illustrate the image data having black streaks eliminated after four-line periods delayed and the image data B after four-line periods delayed. The selection circuit 41 selects the image data having black streaks eliminated during the black streak detecting data being "0"; and it selects the image data B after four-line periods delayed during the data being "1". Here, the image data corresponding to the first half four-line periods of the image data having black streaks eliminated is influenced by adhesion of leavings. However, the foregoing selection operation performed by the selection circuit 41 selects the image data B not influenced by adhesion of leavings, instead of the image data having black streaks eliminated that is influenced by adhesion of the leavings. Thus, as shown in FIG. 8G, the final image data having black streaks eliminated that is not influenced by adhesion of leavings are outputted from the selection circuit 41.

As described above, even if there is a variation in the copy feeding speed, this embodiment accurately detects, without being influenced by the variation of the speed, the streaky noises by adhesion of leavings from the image data, and obtains high quality output images having streaky noises eliminated.

Figure 9:
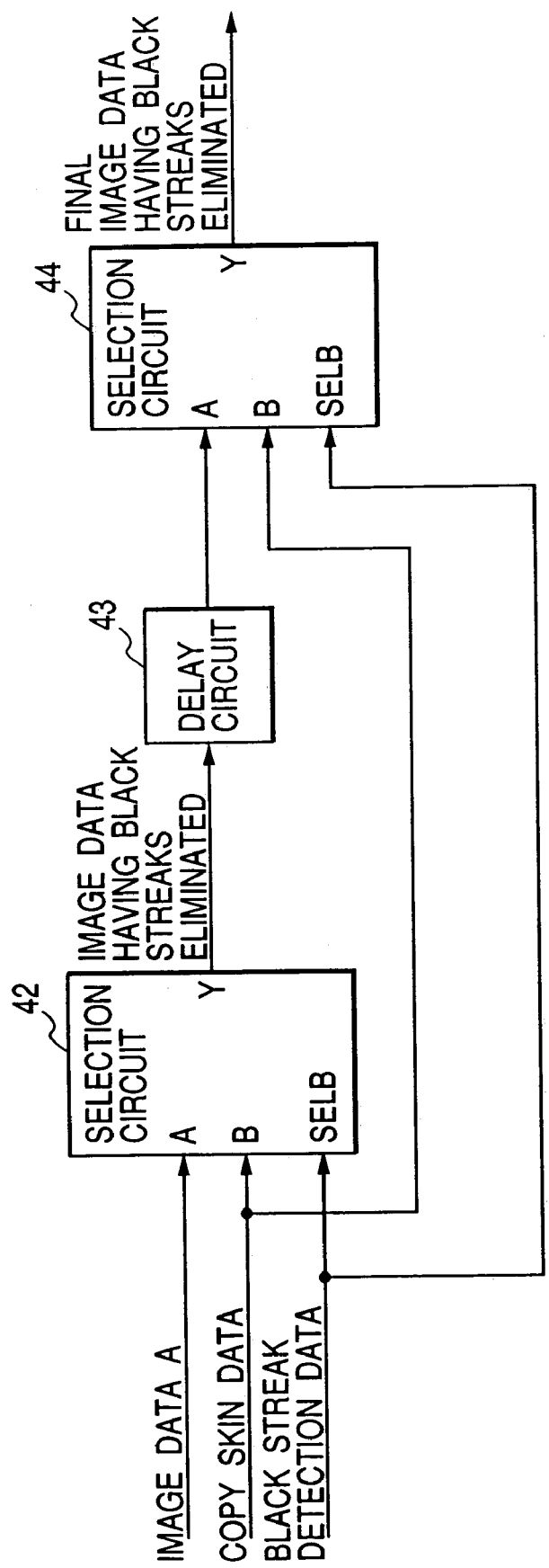
FIG. 9 is a block diagram to illustrate another construction of the streak eliminator.

The embodiment described above is only an illustration of the present invention, and it is possible to make various changes and modifications without departing from the spirit and scope of present invention. The following modifications can be considered with regard to the foregoing embodiment, as examples. (1) The streak eliminator 9 may take on the construction shown in FIG. 9. In FIG. 9, selection circuits 42 and 44 correspond to the selection circuits 38 and 41 in FIG. 7, and a delay circuit 43 corresponds to the delay circuit 39 in FIG. 7. The streak eliminator 9 shown in FIG. 7 replaced a part of the image data A that was influenced by adhesion of leavings by the image data B. In contrast to this, the streak eliminator 9 shown in FIG. 9 replaces the image data A influenced by adhesion of leavings by copy skin data. The modified example here employs the copy skin data supplied from the image processor 10. That is, since the image processor 10 stores image data (namely, concentration of the texture of a copy) obtained from the front end of a copy of character data that does not usually contain image data, the streak eliminator 9 acquires the copy skin data from the image processor 10, and replaces the image data A influenced by adhesion of leavings by the copy skin data. According to this modified example, since the part influenced by adhesion of leavings in the output images is replaced by the copy skin, more natural output images can be obtained in comparison to the conventional technique that the part is replaced by fixed data. (2) The foregoing embodiment took on the construction to detect black streaks appearing on a white back ground, however it may take on a construction to detect white streaks appearing on a black background. Concretely, in the foregoing embodiment, the construction of the data comparison block 27 of the streak detector 8 is needed to be modified in such a manner that the data comparison block 27 outputs "1" as the leavings determination bits when the image data A is lower than the image data B and the difference of both exceeds a specific threshold level. According to this modified example, when white leavings are adhered to the reading unit in reading images on the black background, the white streaky noises appearing on the read images can be detected with accuracy.

(3) By a user's designation, it may be made to select either the black streaky noise detection or the white streaky noise detection. Concretely, when a user designates the black streaky noise detection, the construction of the data comparison block 27 of the streak detector 8 is needed to be modified such that the leavings determination bits become "1" when the image data A is higher than the image data B and the difference of both exceeds a specific threshold level; and when the user designates the white streaky noise detection, the construction of the data comparison block 27 of the streak detector 8 is needed to be modified such that the leavings determination bits become "1" when the image data A is lower than the image data B and the difference of both exceeds a specific threshold level. According to this modified example, when the copy skin of a read object is white, the black streaky noise detection can be selected, and when the copy skin is black, the white streaky noise detection can be selected. In this manner, this modified example can eliminate to select and detect high noises that give harmful influences to the quality of output images.

(4) The foregoing embodiment takes two reading positions, however it may take three or more reading positions. The functions of each unit in this modified example are as follows. First, when it compares the image data at each of the reading positions and all the image data is coincident, the streak detector 8 outputs a signal indicating that the image data does not contain streaky noises. In this case, the streak eliminator 9 selects the image data obtained from the specific reading positions as the output image data. And, when inconsistency is generated in succession between more than two kinds of image data as to a plurality of pixels arrayed in the sub-scanning direction, the streak detector 8 determines that streaky noises by adhesion of leavings are generated as to the concerned plural pixels. In this case, the streak eliminator 9 conducts the majority operation among the image data as to the concerned plural pixels, and selects one item of the image data belonging to the majority side as the output image data. According to this modified example, the image data not containing noises can appropriately be selected when any one of three or more items of image data contains noises.

(5) In the foregoing modified example (4), when streaky noises are generated, the majority operation was carried out among the image data as to the concerned plural pixels, and one item of the image data belonging to the majority side was specified as the output image data. In this modified example, however, as to the concerned plural pixels, two items of image data having the least difference among the image data are selected, and one of the two items of image data are selected as the output image data. Further, except for such a selection method, the average calculated from the two items of image data, for example, may be employed as the output image data, or the higher one of the two image data items may be adopted as the output image data. The modified example (5) also achieves the similar effect to the modified example (4).

(6) Instead of using all the image data at three or more reading positions, the image data at the two reading positions of them which a user, for example, designates is used, whereby the streak detection and streak elimination may be carried out as in the first embodiment.

B. Second Embodiment

According to the first embodiment, if streaky noises are generated in the image data A at the downstream reading position, the image data A containing the noises is replaced by the image data B at the upstream reading position in the streak eliminator 9 (see FIG. 1); and therefore, the output images with the streaky noises eliminated can be formed.

However, the output images thus obtained are formed by the image data A as for the part corresponding to the periods for which the streaky noises are not generated, and by the image data B as for the part corresponding to the periods for which the streaky noises are generated. And, the image data A and B are obtained by applying the signal processing (sample and hold, A/D conversion, shading correction, etc.) by individual signal processors to the analog image signals A and B each outputted from the individual line sensors. Thus, since the image data A and B are generated through individual formation processes, if the output images are formed by combining both, on the boundary between both appears the discontinuity resulting from the differences in the formation processes of both, for example, the differences in the characteristics of the line sensors, the differences in the degrees of the shading corrections applied to both of the image data, and the like, which will give more or less a viewer a feeling that something is wrong.

Therefore, in order to obtain very good output images when leavings are adhered to the reading unit for acquiring the image data A, it is preferable to clean off the leavings so that streaky noises are not generated on the image data A, and to form the output images with only one item of image data A.

However, if leavings are adhered to the optical paths inside the image reading device such as mirrors and lenses, etc., it is not easy to remove the leavings. Therefore, in such cases, the use of the image reading device left with the adhered leavings cannot be avoided for a while. Accordingly, output images combined with two kinds of the image data A and B will be formed.

This embodiment is to solve the foregoing problem.

Figure 10:
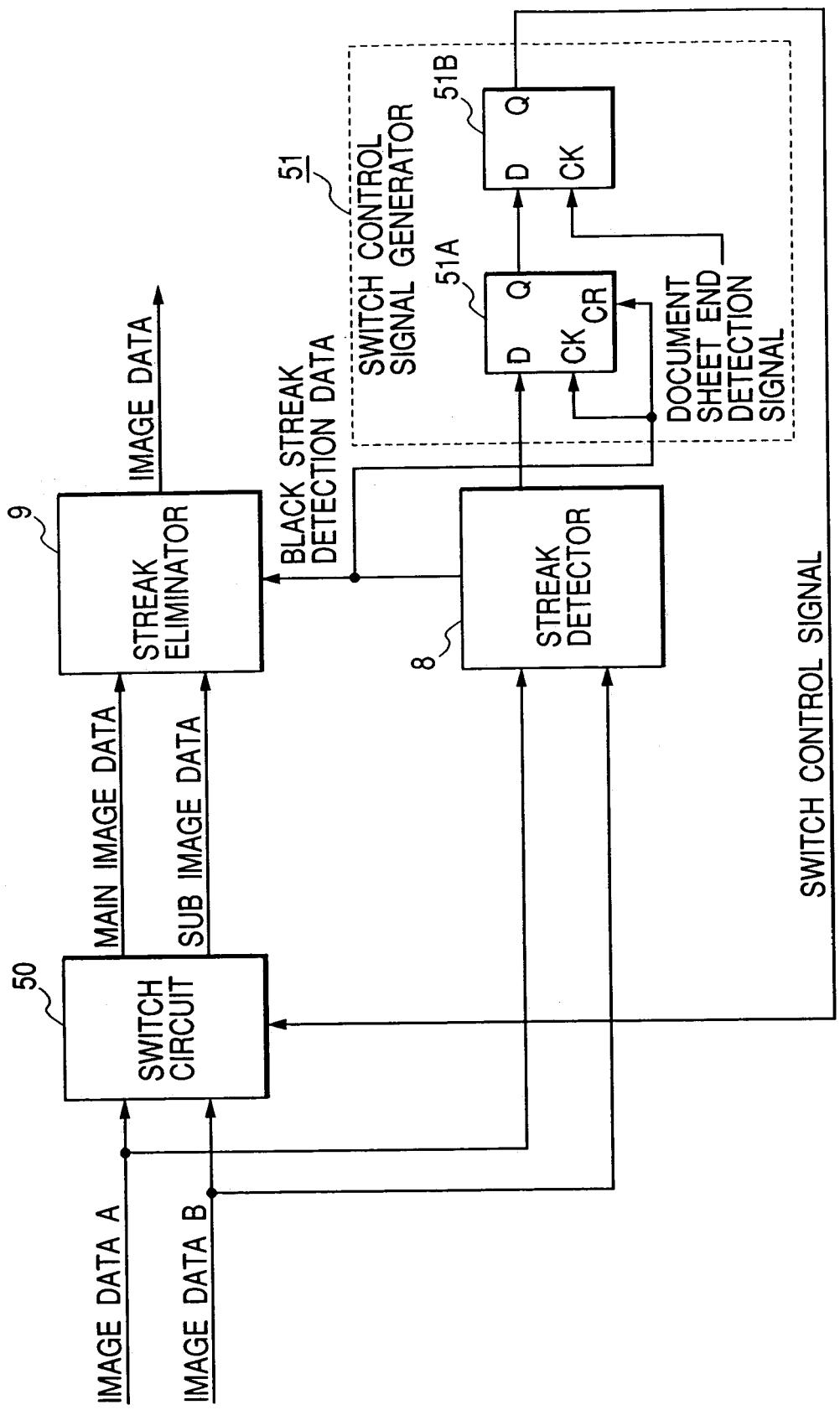
FIG. 10 is a block diagram to illustrate a construction of the image reading device relating to the second embodiment of present invention.

FIG. 10 illustrates a part of the construction of the image reading device relating to this embodiment. As shown in FIG. 10, the image reading device relating to this embodiment is provided with a switch circuit 50 on the previous stage of the streak eliminator 9 (see FIG. 1 and FIG. 7) in the first embodiment, a switch control signal generator 51 on the subsequent stage of the streak detector 8 (see FIG. 1 and FIG. 4) that supplies a switch control signal to the switch circuit 50.

The switch circuit 50 is supplied with the image data A from the shading correction circuit 6A in FIG. 1 and the image data B from the output delay circuit 7. Here, suppose that leavings are not adhered at the downstream reading position to acquire the image data A, and streaky noises are not detected from the image data A immediately before the copy reading operation. In this case, the switch control signal from the switch control signal generator 51 is "0". The concrete construction of the switch control signal generator 51 will be described later.

In this manner, when the switch control signal is "0", the switch circuit 50 supplies the image data A as main image data and the image data B as sub-image data to the streak eliminator 9. The main image data is used to basically form the output images. The sub-image data is used to acquire image data with noises removed by correcting the main image data. And, the streak eliminator 9 generates the image data with streaky noises removed by using these main image data and sub-image data. That is, if the main image data does not contain streaky noises, the main image data is outputted to the image processor 10 (see FIG. 1); and if the main image data contains streaky noises, the sub-image data is outputted to the image processor 10 instead of the main image data. The switching to output either the main image data or the sub-image data is conducted by one pixel. The determination as to whether or not the main image data contains streaky noises is conducted by the streak detector 8, and the switching of the image data is conducted by the streak eliminator 9 on the basis of the black streak detecting data being the determination result by the streak detector 8. The details of the streak eliminator 9 and the streak detector 8 are as explained in the first embodiment.

Next, suppose that the streak detector 8 detects black streaky noises included in the image data A in a reading operation of a copy, and the black streak detecting data became "1" for at least once during reading of last one line at the end of the copy. In this case, the switch control signal is switched from "0" to "1" by the switch control signal generator 51. Here, if the black streak detecting data "1" is not outputted during reading of the last line at the end of the copy, the switch control signal will maintain "0".

In the construction shown in FIG. 10, the switch control signal generator 51 is comprised of a latch circuit 51A and 51B. Here, the data input terminal D of the latch circuit 51A is supplied with the output signal of the AND circuit 32 (see FIG. 4) in the streak detector 8, and the clock terminal CK and the clear terminal CR are supplied with the black streak detecting data. Also, the data input terminal D of the latch circuit 51B is supplied with the output signal from the latch circuit 51A, and the clock terminal CK is supplied with the copy end detecting signal. The switch control signal generator 51 is provided with a circuit (not illustrated) configured by the latch circuit 51A and 51B mentioned above, corresponding to each of the pixels constituting an image for one line; and it is further provided with an OR circuit (not illustrated) that outputs the logical sum of the output signal from the latch circuit 51B corresponding to each of the pixels, as the switch control signal.

The concrete operation of this construction is as follows. First, suppose that the black streak detecting data became "1" during reading of the last line in the reading operation of a copy. At this moment, the output signal of the AND circuit 32 inside the streak detector 8 is "1", and this "1" is latched by the latch circuit 51A. Thereafter, as the copy end detecting signal is generated, the output signal "1" from the latch circuit 51A is latched by the latch circuit 51B. As the result, the switch control signal becomes "1". On the other hand, when the black streak detecting data does not become "1" even for one time, the switch control signal becomes "0".

When the switch control signal becomes "1", the streak eliminator 9 is provided with the image data B as the main image data and the image data A as the sub-image data by the switch circuit 50 during reading of the next copy. In this case, the streak eliminator 9 ignores the black streak detecting data from the streak detector 8, and always outputs the main image data (namely, the image data B) to the image processor 10. Therefore, if there are not leavings, etc., adhered at the upstream reading position, good output images can be formed by using this main image data.

Incidentally, the reason to ignore the black streak detecting data during use of the image data B as the main image data lies in that the black streak detecting data indicates whether or not the image data A (sub-image data) includes black streaky noises, and is not instrumental in correction of the main image data.

Suppose that the adhered leavings at the downstream reading position are thereafter cleaned off, and copy reading is conducted. At this moment, the image data A not including the black streaky noises is acquired at the downstream reading position; and if the black streak detecting data outputted from the streak detector 8 does not become "1" even for one time during reading of the last one line of the copy, the switch control signal will be switched from "1" to "0" by the switch control signal generator 51. Therefore, the streak eliminator 9 is provided with the image data A as the main image data and the image data B as the sub-image data by the switch circuit 50 during reading of the next copy. In this case, the streak eliminator 9 monitors the black streak detecting data from the streak detector 8, and corrects the black streak detecting data with the sub-image data when the main image data contain black streaky noises.

Thus, according to this embodiment, when streaky noises are detected from the main image data during reading of a copy, the image data obtained from the other reading position is employed as the main image data, and accordingly good output images can be obtained without correction of image data.

The following modifications can be considered as for the foregoing embodiment.

Figure 11:
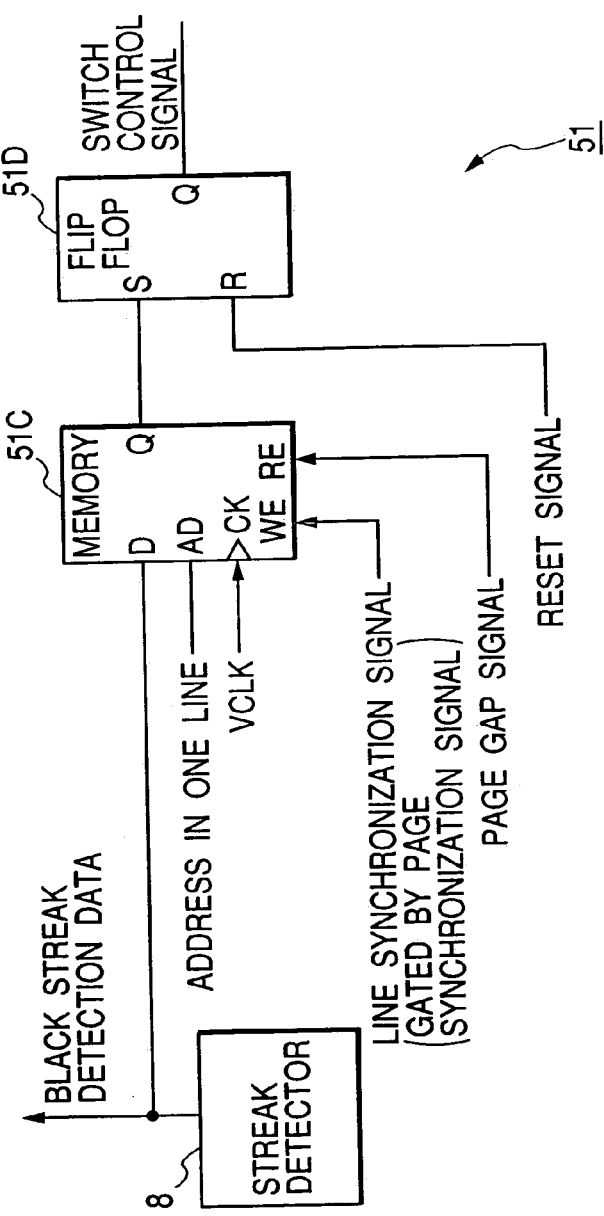
FIG. 11 is a block diagram to illustrate a construction of a switch control signal generator in the modified example of the second embodiment.
Figure 12:
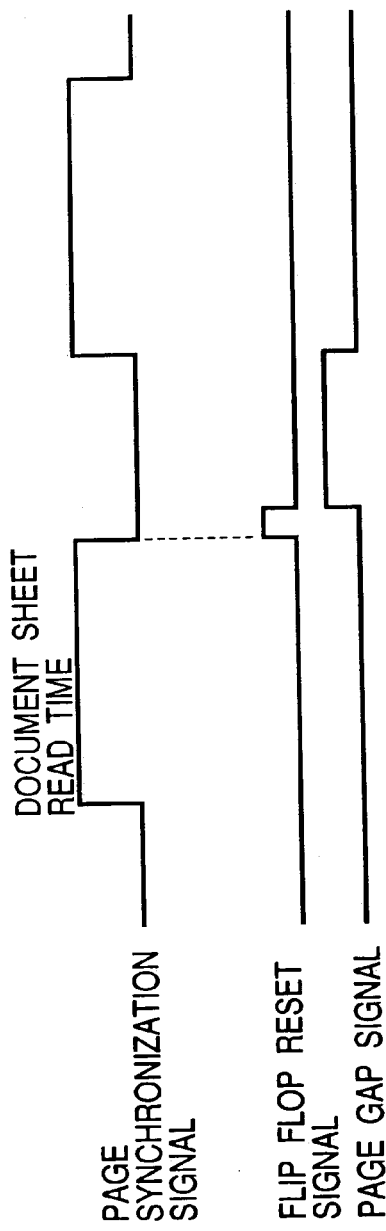
FIG. 12 is a timing chart to illustrate the operation of the switch control signal generator.

(1) The foregoing embodiment requires the switch control generators 51 in FIG. 10 for the number of the pixels, namely, several thousands of them. In this modified example, in order to make the circuit scale smaller, the switch control generators 51 for the number of the pixels in FIG. 10 are replaced with a switch control signal generator 51 comprising a memory 51C and a flip flop 51D as shown in FIG. 11. FIG. 12 is a timing chart to illustrate the operation of the switch control signal generator 51 shown in FIG. 11. Referring to this timing chart, the operation of the switch control signal generator 51 in this modified example will now be described.

In FIG. 12, during the period of copy reading, a page synchronization signal becomes "1", and a page gap signal becomes "0". And, when the page synchronization signal is "1", a line synchronization signal is made to be "1" during each main scanning period, and the writing into the memory 51C is permitted. Further, during each main scanning period, addresses inside a line corresponding to the positions of pixels on the main scanning line are sequentially supplied synchronously with a clock VCLK to an address input terminal of the memory 51C. On the other hand, the black streak detecting data corresponding to the pixels on the main scanning line is sequentially outputted synchronously with the clock VCLK from the streak detector 8, which is sequentially supplied to a data input terminal of the memory 51C. In consequence, the black streak detecting data corresponding to the pixels for one line of the main scanning line is written into the memory 51C synchronously with the clock VCLK. This operation is carried out for each main scanning period, and the black streak detecting data corresponding to each main scanning line is overwritten on a specific memory area inside the memory 51C.

And, when the copy reading period comes to an end, the page synchronization signal becomes "0"; and accordingly, the line synchronization signal is forcibly made to be "0", and the writing to the memory 51C is prohibited. At the same time, the flip flop 51D is reset. Thereafter, the page gap signal becomes "1", whereby the data reading from the memory 51C is permitted. And, synchronously with the clock VCLK, the addresses inside a line corresponding to the positions of pixels on the main scanning line are sequentially supplied to the address input terminal of the memory 51C, and thereby the black streak detecting data corresponding to the pixels for one line of the main scanning line read at the final period of reading the copy is sequentially read out from the memory 51C.

Here, when black streaks are detected by the streak detector 8 at the final one line of the copy, at least one bit of the black streak detecting data read out from the memory 51C is "1". In this case, the black streak detecting data is given to a set terminal of the flip flop 51D, and thereby the flip flop 51D is set, so that the switch control signal becomes "1". Further, if the black streaks are not detected at the final one line of the copy, the black streak detecting data read out from the memory 51C becomes "1" for all the bits, and the switch control signal remains "0".

According to this modified embodiment, the image reading device can be made up with a smaller construction than that of the foregoing embodiment.

(2) In the foregoing embodiment, the main image data and the sub-image data are switched automatically by detection of streaky noises. However, the switching of the main image data and the sub-image data may be made by a user's switching operation after confirming a display panel, for example, on which the detection result of streaky noises is presented.

C. Third Embodiment

Figure 13:
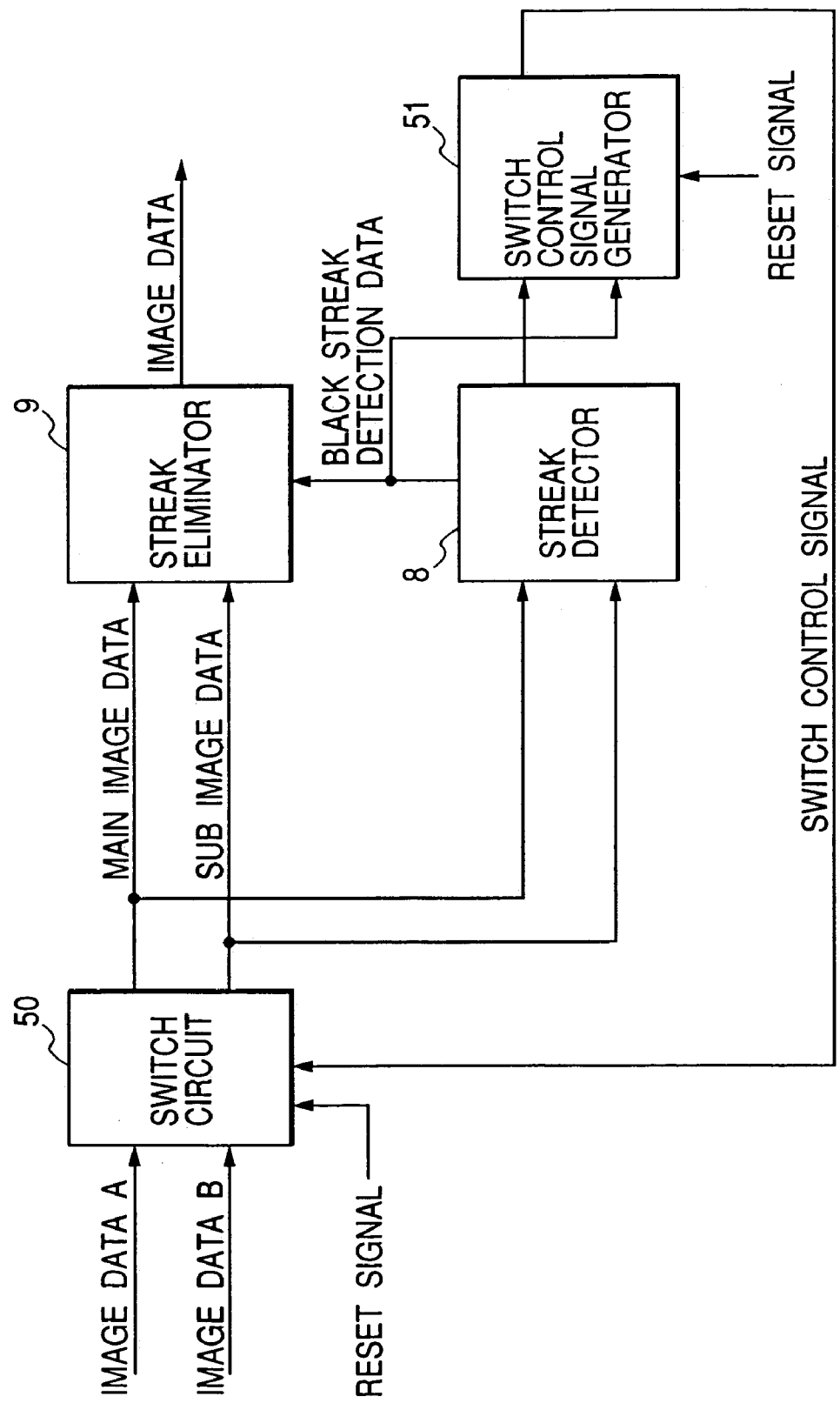
FIG. 13 is a block diagram to illustrate a construction of the image reading device relating to the third embodiment of present invention.

FIG. 13 illustrates a part of the construction of the image reading device relating to the third embodiment of the present invention. This embodiment adds the following modifications to the second embodiment.

a. The main image data and the sub-image data outputted from the switch circuit 50 are supplied to the streak detector 8, and the streak detector 8 is made to detect whether the main image data contains black streaky noises.

b. The switch circuit 50 is made to switch the main image data and the sub-image data just once. That is, at the beginning, the switch circuit 50 in this embodiment takes on the image data A as the main image data and the image data B as the sub-image data. And, if the switch control signal becomes "1" during reading of a copy, the image data B is switched into the main image data and the image data A is switched into the sub-image data. Thereafter, if the forceful reset operation is made, the image data A is switched into the main image data, and the image data B is switched into the sub-image data.

c. The streak eliminator 9 monitors the black streak detecting data supplied from the streak detector 8, regardless of the main image data being the image data A or the image data B; and if the main image data contains black streaky noises, the correction of the main image data will be made using the sub-image data. d. The configuration of the switch control signal generator 51 is modified such that the foregoing forceful reset operation initializes the switch control signal to "0".

The operation of this embodiment will now be described. First, when a reading of a copy is conducted in the state that the image data A is used as the main image data, suppose that the black streak detecting data became "1" and the switch control signal became "1" in the copy end detection by adhesion of leavings at the downstream reading position.

In this case, in the subsequent copy reading, the image data B is to be served as the main image data and the image data A is to be served as the sub-image data. In this case, if there is not an adhesion of leavings at the upstream reading position, good image data (image data B) will be acquired in the subsequent copy reading. Here, if the image data B is served as the main image data, the user will be informed of that through an indication on the display panel (not illustrated) or the like.

Assuming that leavings are adhered also at the upstream reading position thereafter, the main image data (image data B) obtained from this upstream reading position will contain black streaky noises. In this case, if the black streak detector 8 detects the black streaky noises, the streak eliminator 9 will replace the part influenced by the black streaky noises by the sub-image data. Also in this case, since the black streak detecting data becomes "1", the switch control signal can possibly be "1". However, when the image data B is served as the main image data, the main image data and the sub-image data will not be switched unless the forcible reset is operated, even though the switch control signal becomes "1".

Meanwhile, the user will be able to know that the image data B is served as the main image data through the indication on the display panel. If this is riot preferable, the user is only needed to clean the area near the copy reading position on the contact glass of the image reading device to wipe off the adhered thrashes, and to conduct the foregoing reset operation. Thereby, the image data A will be served as the main image data and the image data B will be served as the sub-image data. If the cleaning is not sufficient and the thrashes are not cleaned off, the switch control signal will become "1", and again the main image data and the sub-image data will be switched, so that the state will be indicated on the display panel. In this case, the user is needed to clean again, and to conduct the reset operation. Even with this operation repeated, it is possible that the switch control signal becomes "1" each time in reading the copy. In such a case, since leavings can possibly be adhered on the optical paths inside the image reading device, a maintenance operator is needed to be called in to remove the leavings off.

D. Fourth Embodiment

Figure 14:
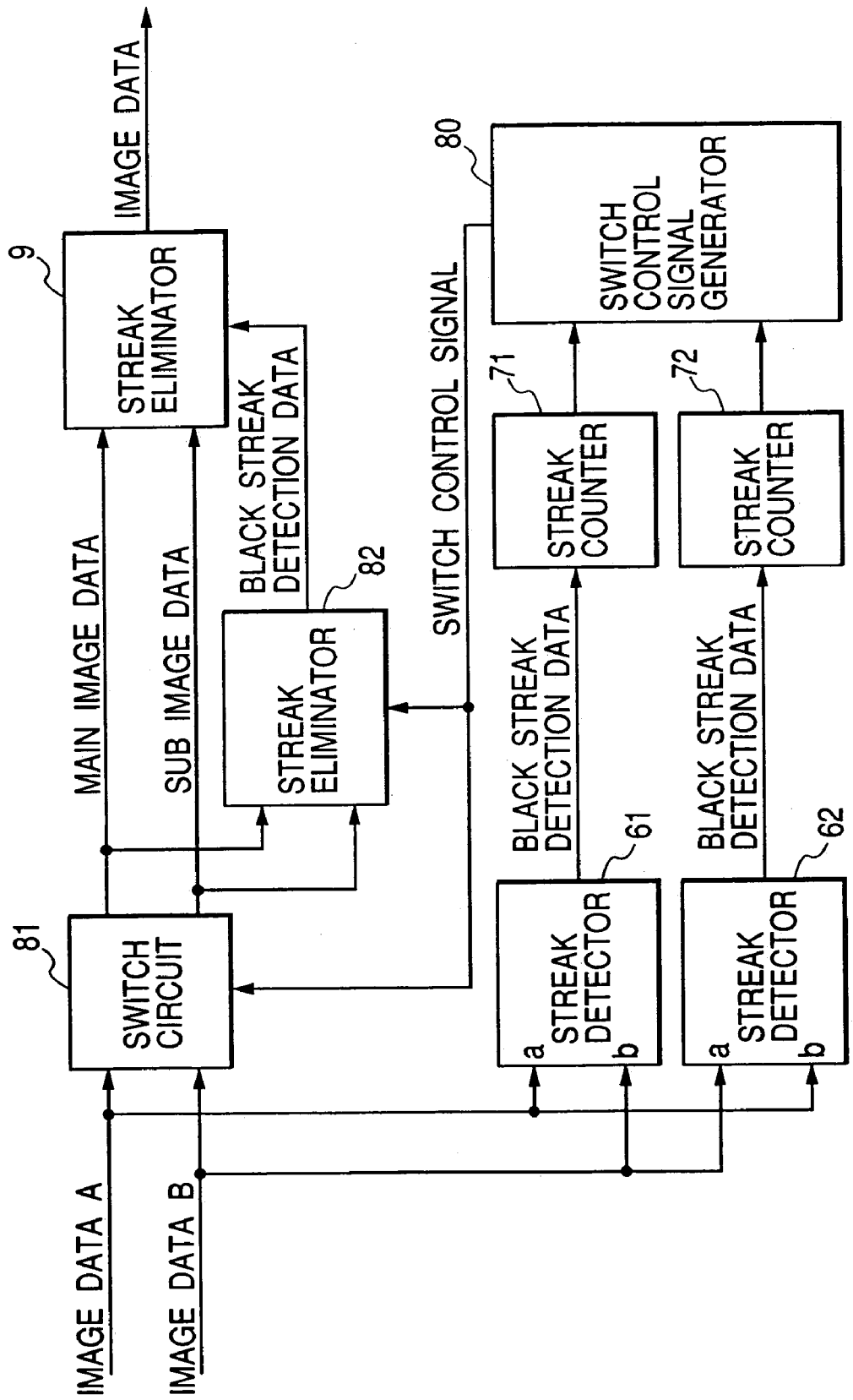
FIG. 14 is a block diagram to illustrate a construction of the image reading device relating to the fourth embodiment of present invention.

FIG. 14 is a block diagram to illustrate a part of the construction of the image reading device relating to the fourth embodiment of the present invention. The part shown in FIG. 14 corresponds to the part including the streak detector 8 and the streak eliminator 9 in the foregoing first embodiment. Here, the image data A is the data outputted from the shading correction circuit 6A and the image data B is the data outputted from the output delay circuit 7 in the first, embodiment.

In FIG. 14, a streak detector 61 determines by referring the image data B whether or not the image data A contains black streaky noises, and outputs the black streak detecting data indicating the result. Also, a streak detector 62 determines by referring the image data A whether or not the image data B contains black streaky noises, and outputs the black streak detecting data indicating the result. The constructions of these streak detectors 61 and 62 are the same as explained in the first embodiment referring to FIG. 4. In FIG. 14, input terminals a and b provided on the streak detectors 61 and 62 correspond to the input terminals A and B to which the image data A and B each are inputted.

The black streak detecting data outputted from the streak detectors 61 and 62 is supplied to streak counters 71 and 72. The streak counters 71 and 72 count the numbers of "1" included in each item of the black streak detecting data for the last line which are supplied during the copy end detection, and the count numbers each are supplied to a switch control signal generator 80. Here, if the image data A does not contain black streaky noises at all, the count number of the streak counter 71 becomes [0]; however, if the image data A contains a great many black streaky noises or wide black streaky noises, the concerned count number will become a large number. This is also the case with the count number of the streak counter 72, and the concerned count number is to depend on the number or quantity of the black streaky noises contained in the image data B.

The switch control signal generator 80 compares the count numbers of the streak counters 71 and 72, and determines the image data A as the main image data and the image data B as the sub-image data in case of the former being smaller than the latter; and it determines the image data B as the main image data and the image data A as the sub-image data in case of the former being larger than the latter. And on the basis of this determination, the switch control signal generator 80 supplies the switch control signal to a switch circuit 81 to control the switching.

At the next copy reading, under this switching control, the switch circuit 81 outputs each item of the image data according to the determination made by the switch control signal generator 80, as the main image data and the sub-image data, which are supplied to a streak detector 82 and the streak eliminator 9. And, the streak detector 82 detects black streaky noises contained in the main image data by referring to the sub-image data, and outputs resultant black streak detecting data. The streak eliminator 9 executes on the basis of the black detecting data the correction of the main image data by the sub-image data. The construction of this streak eliminator 9 is the same as already described in the first embodiment with reference to FIG. 7.

According to this embodiment, even if black streaky noises are contained in both of the image data A and the image data B, correction of the main image data is conducted by the streak eliminator 9, serving the image data with less noises as the main image data and the image data with more noises as the sub-image data. Therefore, as good output images as can be acquired, even under such bad conditions that both the image data A and B contain the streaky noises.

Figure 15:
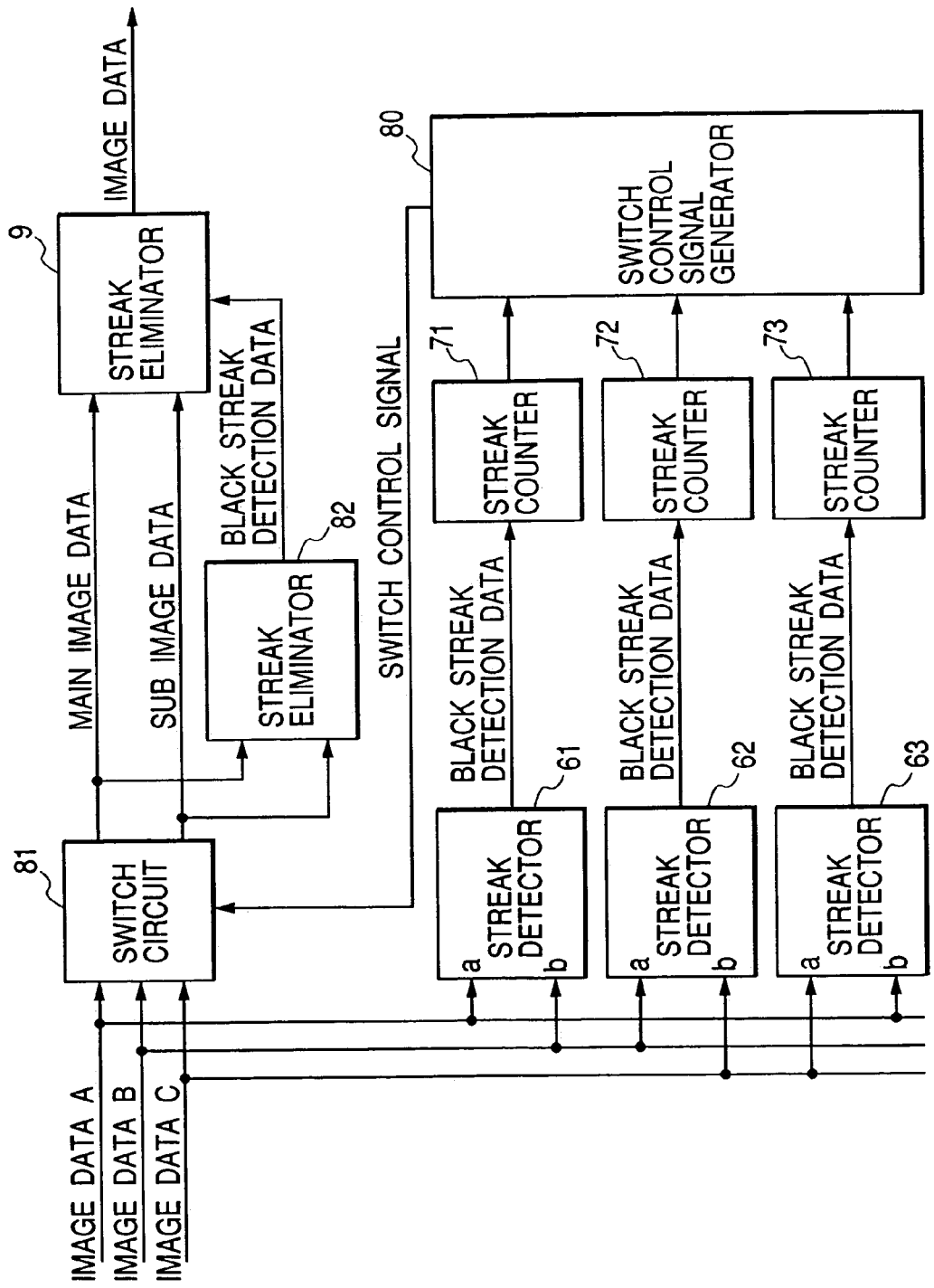
FIG. 15 is a block diagram to illustrate another construction of the image reading device relating to the fourth embodiment of present invention.

In the example shown in FIG. 14, the number of positions to read an image was assumed as two; however, the applicable range of present invention is not limited to this, and it may be provided with three or more reading positions so that the detection of black streaky noises and the correction of the main image data can be performed with the image data at each of the reading positions. FIG. 15 illustrates a modified example of this embodiment in which the images are read at three positions. In FIG. 15, the image data A, B, and C are the data acquired at the three reading positions. Each of the image data has the necessary delay processing applied, and are in phase with each other.

In FIG. 15, a streak detector 61 determines by referring the image data B whether or not the image data A contains black streaky noises, and outputs the black streak detecting data indicating the result. Also, a streak detector 62 determines by referring the image data C whether or not the image data B contains black streaky noises, and outputs the black streak detecting data indicating the result. And, a streak detector 63 determines by referring the image data A whether or not the image data C contains black streaky noises, and outputs the black streak detecting data indicating the result. Streak counters 71 to 73 each count the numbers of "1" in the black streak detecting data from each of the streak detectors 61 to 63. The switch control signal generator 80 compares the count values of the streak counters 71 to 73, and from the comparison result, adopts a data item from among the image data A to C whose noise quantity is the least as the main image data, and adopts another item whose noise quantity is the second least as the sub-image data. And on the basis of this determination, the switch control signal generator 80 supplies the switch circuit 81 with the switch control signal to control the switching. The operation thereafter is the same as the embodiment shown in FIG. 14.

E. Fifth Embodiment

In the second through fourth embodiments, the main image data is switched by the sub-image data in case of the main image data containing streaky noises. In contrast to this, when the main image data is determined to contain the streaky noises, this embodiment moves the upstream and downstream reading positions from the current positions during a period from the end of the copy reading until the start of the next copy reading, without changing the correspondences between the reading positions and the main image data and between the reading positions and the sub-image data. As for the method of movement, it is conceivable to move the mirror 22 in FIG. 2 as an example. Further in this embodiment, when the main image data is determined to contain streaky noises, the position information of the pixels containing the streaky noises are stored in the memory. And, after the reading positions are moved, when the determination as to whether streaky noises are contained is made again with regard to the same pixels as the ones stored in the memory, the control signal to prohibit the reading of the copy is outputted. This embodiment enables to form the output images with the noises due to adhesion of leavings removed, and in case of such a first aid action being ineffective, to forcibly stop ejecting the output images containing the noises.

F. Sixth Embodiment

According to the first embodiment, even when streaky noises occur in the image data A at the downstream reading position, since the image data A including the noises is replaced by the image data B at the upstream reading position in the streak eliminator 9 (refer to FIG. 1), the output image with the streaky noises eliminated can be formed.

Figure 16:
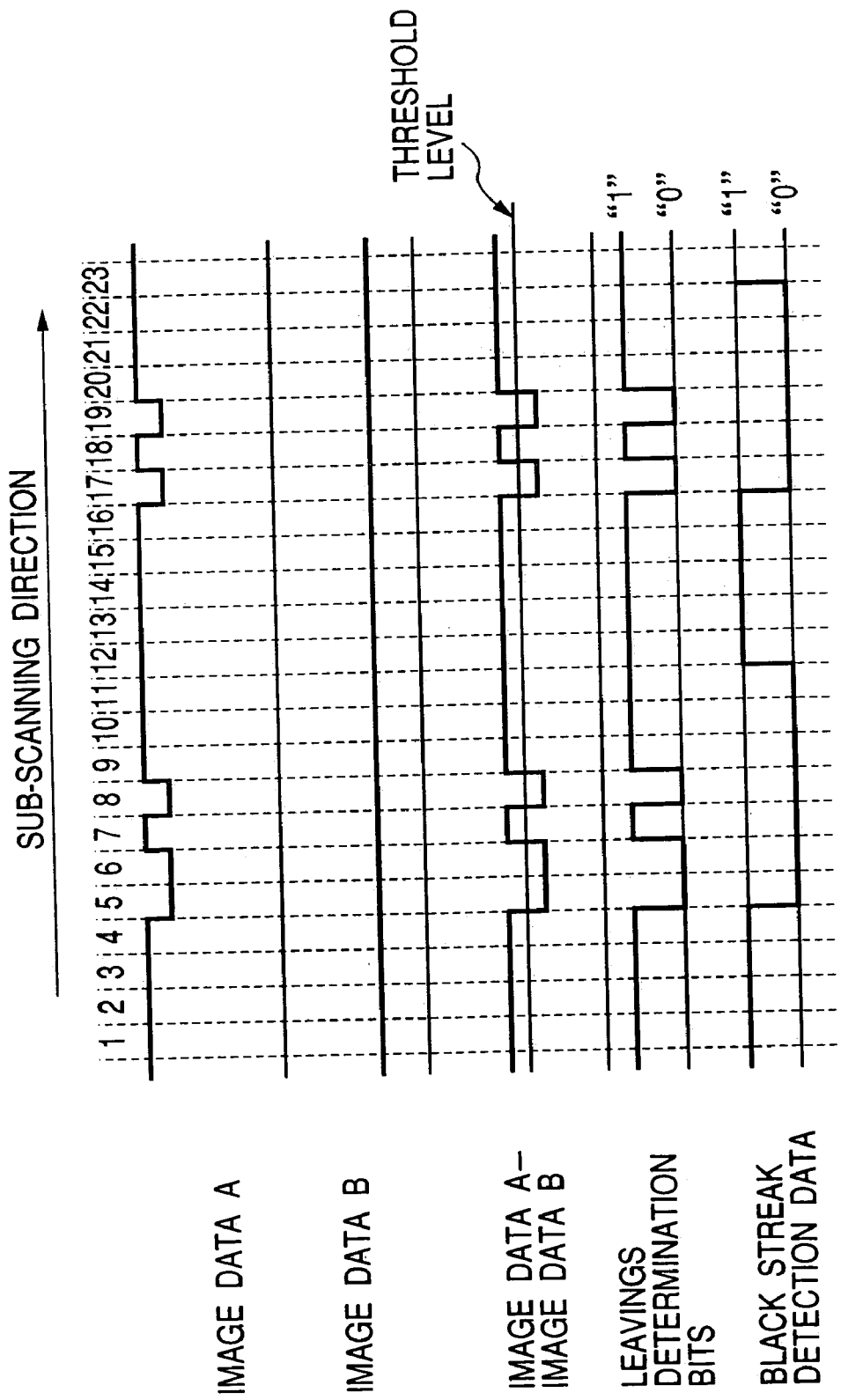
FIG. 16 is a chart to explain the operation of the image reading device relating to the sixth embodiment of the present invention.
Figure 17:
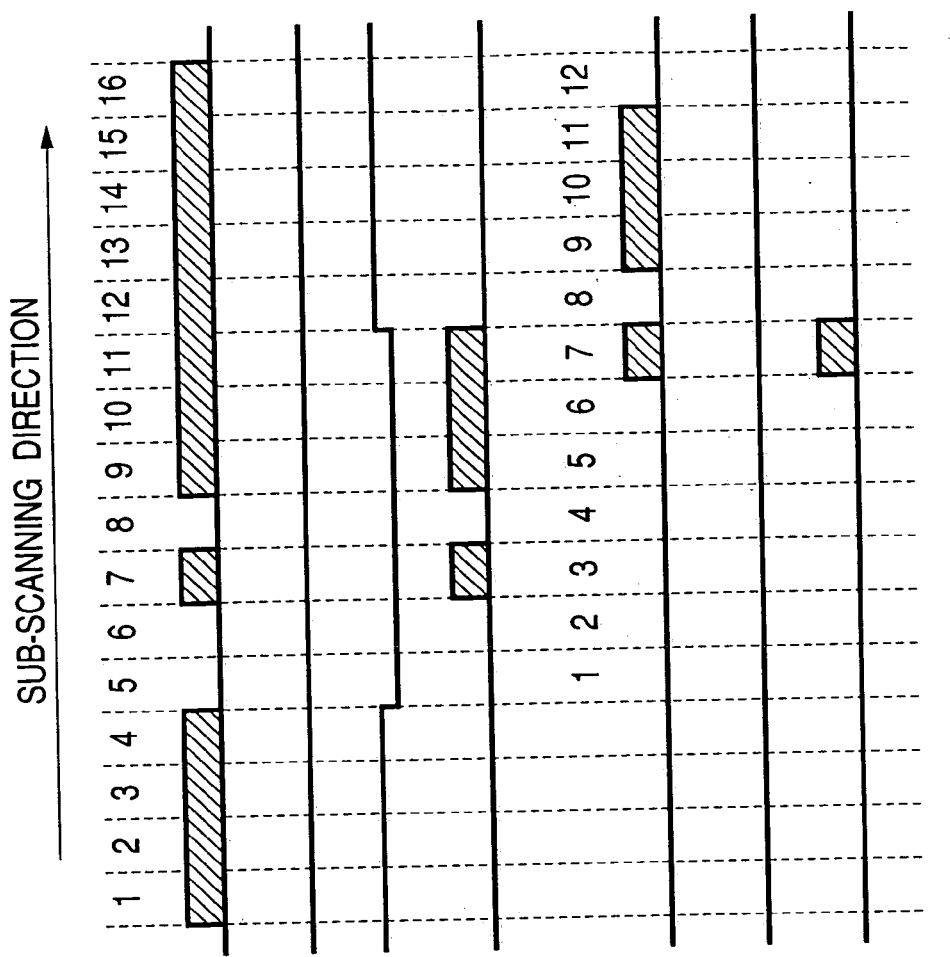
FIGS. 17A–17G are charts to explain the operation of the image reading device relating to the same embodiment.

However, when the density of the streaky noises is so low that the difference between the image data A and image data B comes close to the threshold level, the leavings determination bits become discontinuous due to the oscillation of the device or other noises, and the black streak detecting data (FIG. 16) becomes 0 in the continuity detection block 28 (FIG. 4), the noise is left without being detected (FIG. 17).

This embodiment is to resolve the problems that are described above.

Figure 18:
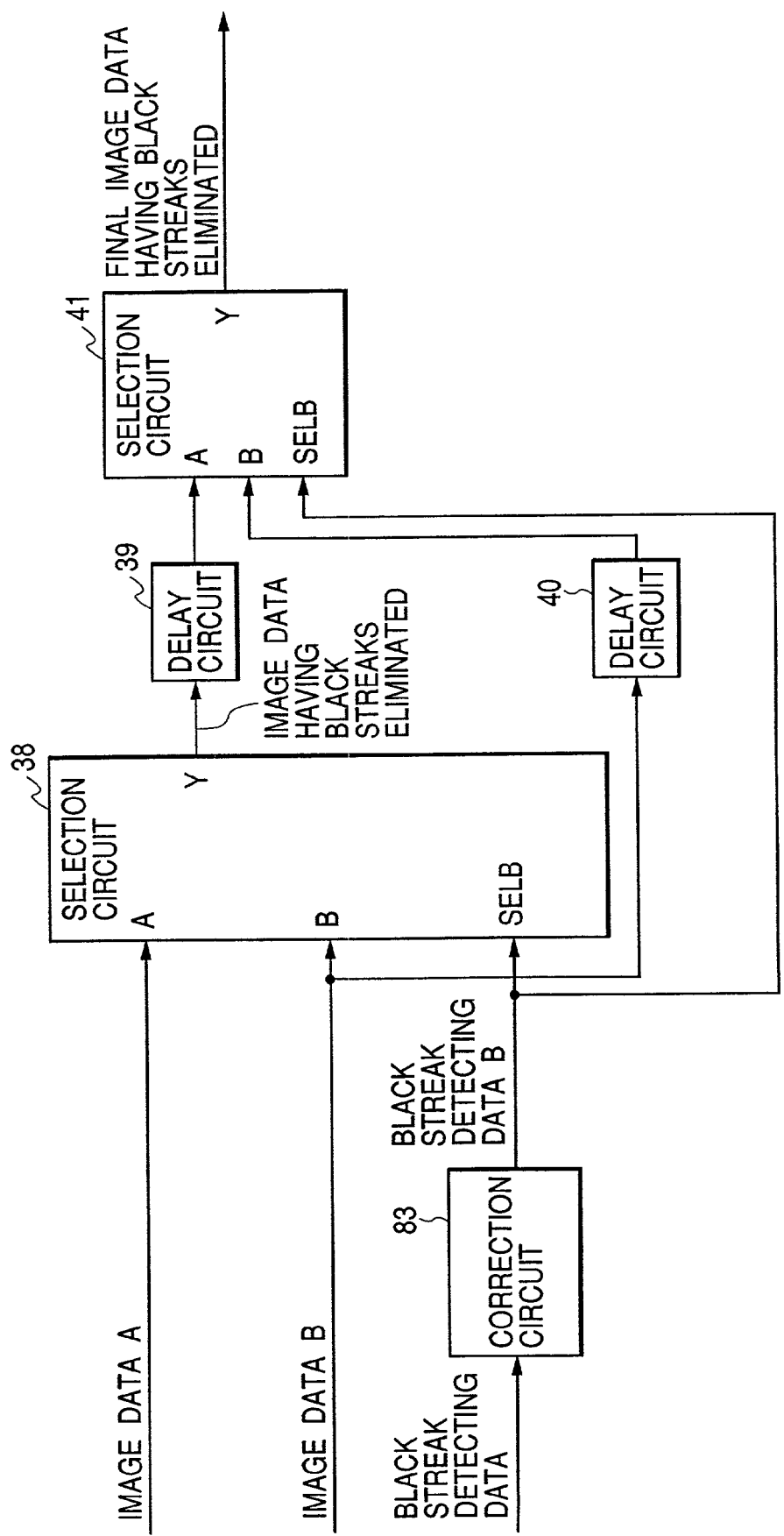
FIG. 18 is a block diagram to illustrate a construction of the streak eliminator in the same embodiment.
Figure 19:
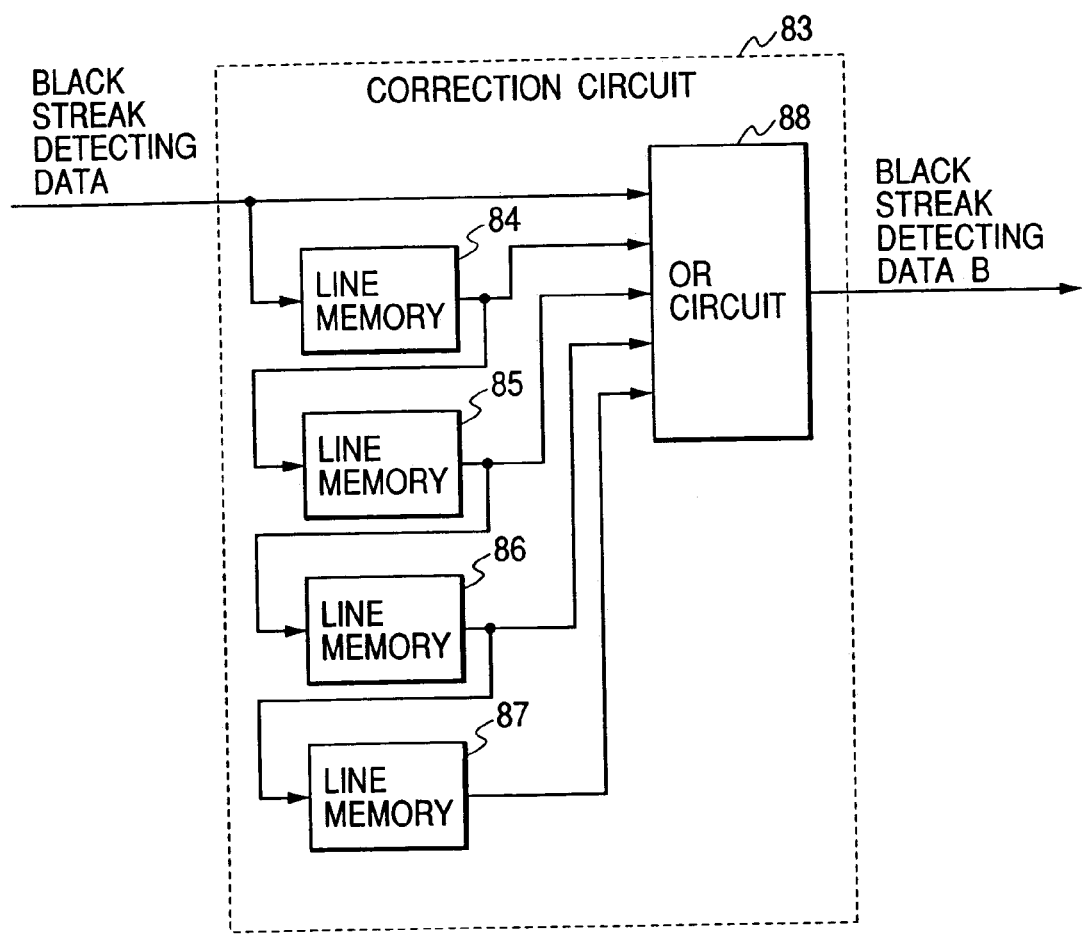
FIG. 19 is a block diagram to illustrate a construction of the correction circuit in the same embodiment.

FIG. 18 illustrates a part of the construction of the image reading device relating to this embodiment. As shown in this FIG. 18, the image reading device relating to this embodiment is configured to add a correction circuit 83 to the streak eliminator 9 in the first embodiment (refer to FIG. 1 and FIG. 7). This correction circuit is configured by line memories 84 through 87 and an OR circuit 88, and generates black streak detecting data B, with the black streak detecting data extended in the sub-scanning direction for a specific number of lines (FIG. 19). In the selection circuit 38, by switching an image with this black streak detecting data B, the same process as the black streak elimination can be applied for the specific number of lines even after the black streak detecting data becomes 0.

FIG. 20 illustrates an operational example of the streak eliminator 9 (FIG. 18) explained above. First, FIG. 20A and FIG. 20B represent the image data A and B (both being the data input to the streak eliminator 9) corresponding to a specific pixel. In this example, the image data A is affected by the adhesion of leavings over the line 2 through the line 12, but it is shown in a dotted line because of the low density. As to where the number of the dotted lines is larger than the continuous line number in the continuity detection block 28 (FIG. 4), the black streak detection data becomes "1", and "0" where it is smaller. Therefore, the black streak detection data is 0 between the lines 9 and 12. The correction circuit outputs to extend this black streak detection data continuously for four lines, which is the black streak detection data B. And when this black streak detection data B is "0", the image data A is selected, and when it is "1", the image data B is selected. Therefore, for the period over the line 5 through the line 8, the image data B without an influence of adhesion of leavings is selected and outputted as an image with black streaks eliminated.

This image data having black streaks eliminated is delayed four line periods by the delay circuit 39. The image data B is also delayed four line periods by delay circuit 40. The image data having black streaks eliminated after having four line periods delayed and the image data B after having four line periods delayed are shown in FIG. 20F and FIG. 20G. The selection circuit 41 selects the image data having black streaks eliminated as long as the black streak detection data B is "0", but as long as it is "1", the selection circuit 41 selects the image data B after having four line periods delayed. Here, for the first four line periods of the image data having black streaks eliminated, the image data is affected by the adhesion of leavings. However, owing to the selecting operation of the selection circuit 41, the image data B without an influence of adhesion of leavings will be selected instead of the image data having black streaks eliminated that is affected by the adhesion of leavings. Thus, the final image data having black streaks eliminated without an influence of adhesion of leavings will be outputted from the selection circuit 41, as shown in FIG. 20H.

As explained above, according to this embodiment, the dotted lines will not remain even when the density of the streaky noises is low, and a high quality output image with streaky noises eliminated can be acquired.

G. Seventh Embodiment

According to the first embodiment, even when streaky noises are generated in the image data A at the downstream reading position, the image data A including the noises can be replaced by the image data B at the upstream reading position in the streak eliminator 9 (refer to FIG. 1), thus allowing the formation of output images with the streaky noises eliminated.

Figure 21A:
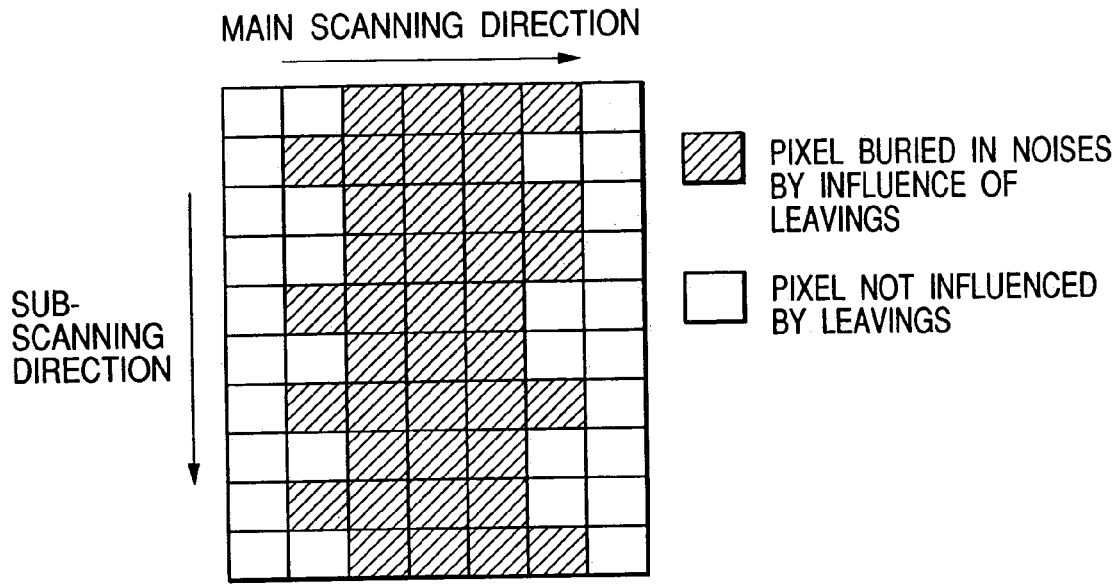
FIGS. 21A–21B are charts to explain the operation of the image reading device relating to the seventh embodiment of the present invention.
Figure 21B:
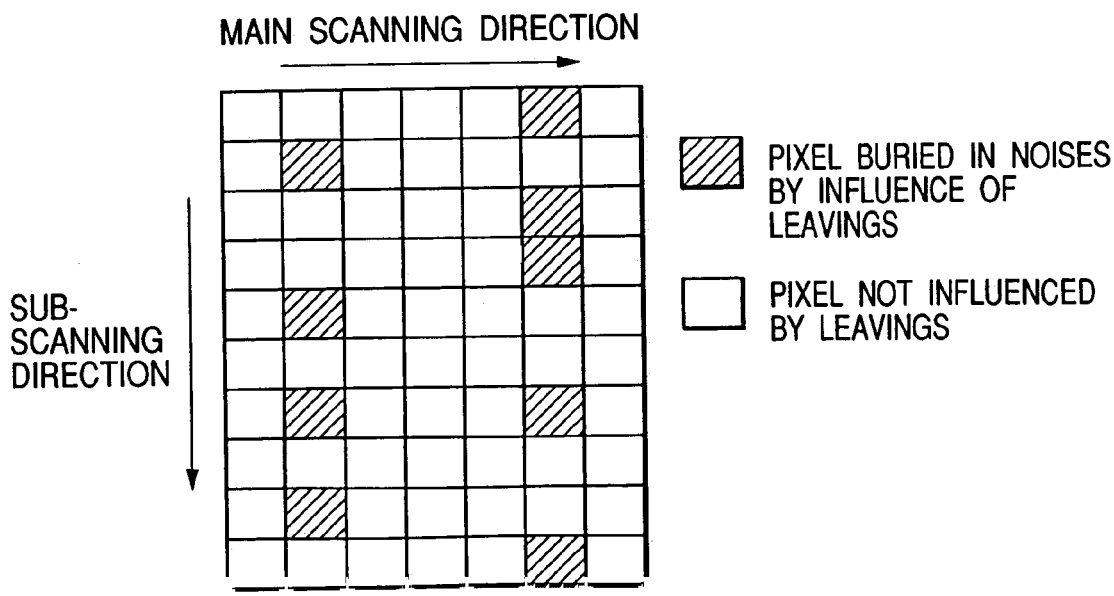

However, when there are streaky noises by the influence of leavings in a large width in the main scanning direction, since the pixels on both ends in the main scanning direction become discontinuous in the sub-scanning direction and the black streak detection data becomes "0" in the continuity detection block 28 (FIG. 4), the noises are left undetected and the pixels on both ends remain in dotted lines (FIG. 21).

This embodiment is to resolve the problems described above.

Figure 22:
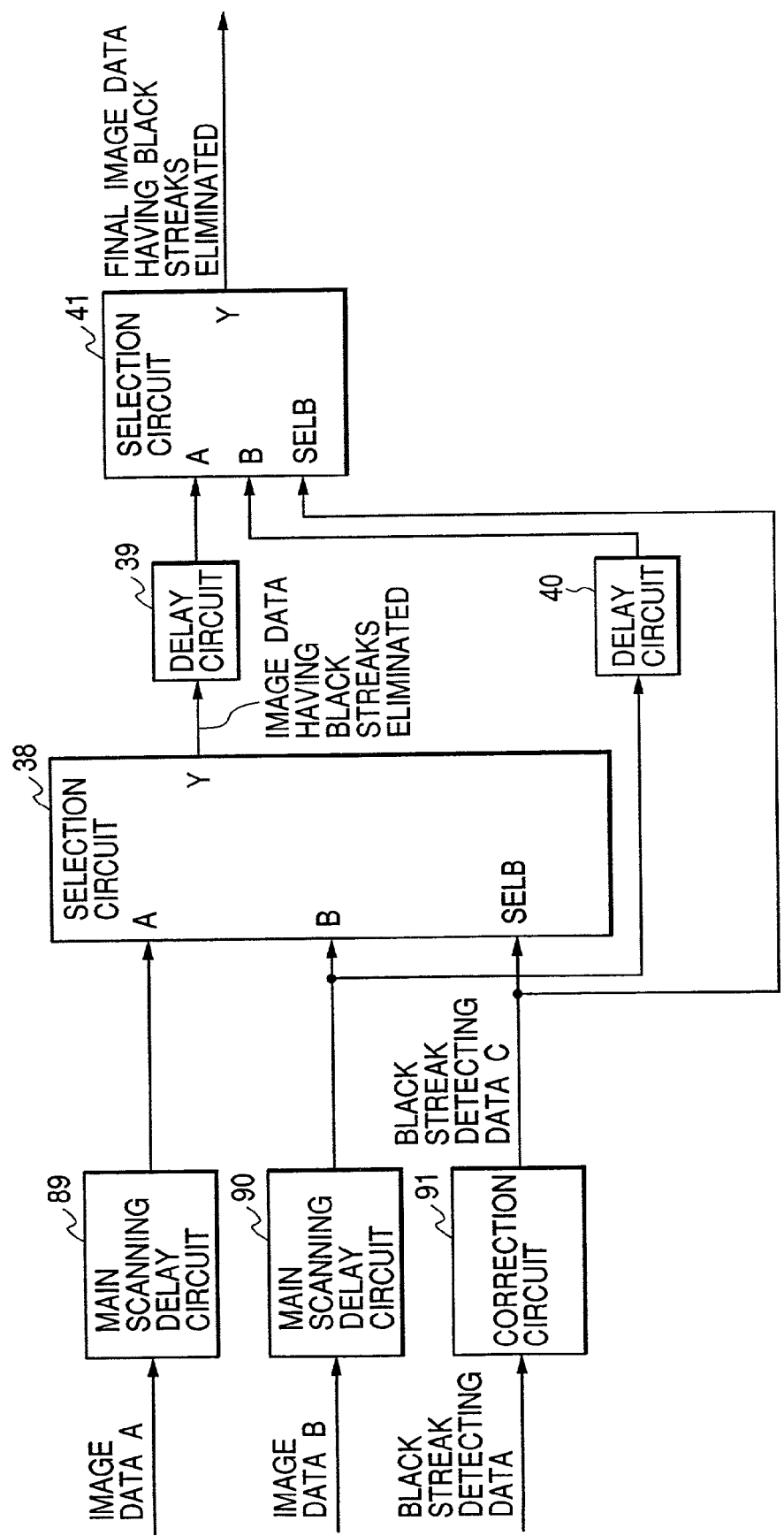
FIG. 22 is a block diagram to illustrate a construction of the streak eliminator relating to the same embodiment.
Figure 23:
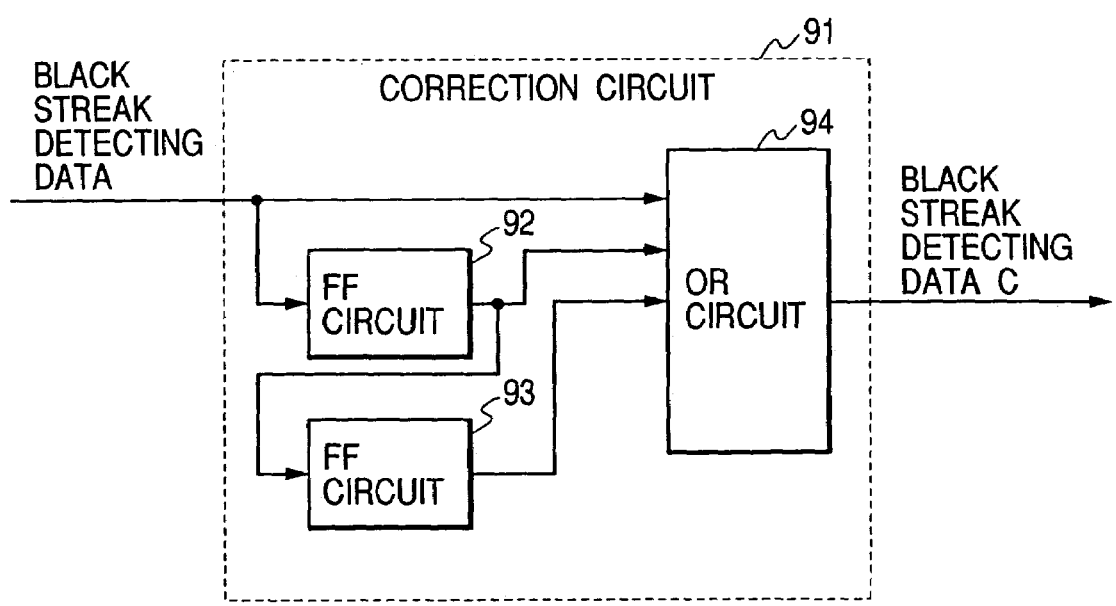
FIG. 23 is a block diagram to illustrate a construction of the correction circuit relating to the same embodiment.

FIG. 22 illustrates a part of the construction of the image reading device relating to this embodiment. As shown in this FIG. 22, the image reading device relating to this embodiment is configured to add main scanning delay circuits 89, 90 and a correction circuit 91 to the streak eliminator 9 (refer to FIG. 1 and FIG. 7) in the first embodiment. This correction circuit 91 is configured by FF circuits 92, 93 and an OR circuit 94, and generates black streak detection data C with inputted black streak detection data extended by two pixels in the main scanning direction (FIG. 23). The main scanning delay circuits 89, 90 delay the image data A and B by one pixel to thereby correct the delay in the correction circuit 91. In the selection circuits 38, 41, by switching the image with the black streak detection data C, the same process as the black streak elimination can be applied also for the pixels on the front and rear in the main scanning direction of the black streak detection data.

FIG. 24 illustrates an operational example of the above mentioned streak eliminator 9 (FIG. 22). First, FIG. 24A and FIG. 24B represent the image data A and B (both are inputted to the streak eliminator 9) corresponding to a specific pixel. In this example, the image data A is affected by adhesion of leavings over A4 through A8, but since the pixels A4 and A8 on both ends are discontinuous in the sub-scanning direction, the black streak detection data indicates "0". The black streak detection data extended in the main scanning direction by two pixels by the correction circuit 91 is the black streak detection data C. When this black streak detection data C is "0", the image data A is selected, and when it is "1", the image data B is selected. However, the image data A and B that are inputted to this selection circuit 38 are delayed by one pixel by the main scanning delay circuits 89, 90 respectively. Therefore, in terms of the image data having black streaks eliminated that is outputted by the selection circuit 38, A4 through A8 of the image data A that is affected by adhesion of leavings will be switched into B4 through B8 of the image data B without an influence by adhesion of leavings, and outputted.

The delay circuit 41 operates in the same manner, and the same process is applied.

The descriptions above relate to the embodiment for each one of the pixels on both ends, and by changing the number of pixels to be delayed in the main scanning circuits 89, 90 and the correction circuit 91, they can also be applied to a plurality of pixels on both ends.

As explained above, according to this embodiment, even when there are streaky noises affected by a large width of leavings in the main scanning direction, a high quality output image with streaky noises eliminated without the noises on either end left in a dotted line can be acquired.

As described above, the image reading device of the present invention is provided with a feeding part that feeds a copy, a plurality of reading parts that read the copy fed by the feeding part, and a noise detecting part that, when comparing image data outputted by a plurality of the reading parts and detecting that a specific number of pixels of the image data are not coincident as to a plurality of pixels arrayed in the sub-scanning direction, determines the image data outputted by a specific reading part among the plurality of the reading parts contains streaky noises; and therefore, it is possible to accurately detect streaky noises even though there are speed variations in the copy feeding, and also to acquire good output images with the noises removed.

The present invention being thus described, it will be obvious that the same may be varied in many ways. Such variations are not to be regarded as a departure from the spirit and scope of present invention, and all such modifications as would be obvious to one skilled in the art are intended to be included within the scope of the following claims.

What is claimed is:

1. An image reading device, comprising:
   a feeding part that is adapted to feed a copy at a plurality of feeding speeds,
   a plurality of reading parts disposed along a feeding path of the copy to read the copy fed by said feeding part, and
   a noise detecting part that compares image data outputted by said plurality of reading parts, detects that a specific number of pixels of the image data are not coincident to a plurality of pixels arrayed in the sub-scanning direction, and determines that the image data outputted by a specific reading part among said plurality of reading parts contains streaky noises regardless of the feeding speed.

2. The image reading device according to claim 1, wherein, when the image data outputted by the specific reading part is larger than the image data outputted by another reading part, said noise detecting part determines that the image data outputted by said specific reading part contains black streaky noises.

3. The image reading device according to claim 1, wherein, when the image data outputted by said specific reading part is smaller than the image data outputted by another reading part, said noise detecting part determines that the image data outputted by said specific reading part contains white streaky noises.

4. The image reading device according to claim 1, further comprising a noise eliminating part that, when said noise detecting part determines the image data to contain noises, removes the noises from the image data outputted by said specific reading part.

5. The image reading device according to claim 4, wherein said noise eliminating part removes the noises by replacing the image data outputted by said specific reading part with the image data outputted by another reading part.

6. The image reading device according to claim 4, further comprising a part that acquires the image data of a skin of said copy, wherein said noise eliminating part removes the noises by replacing the image data outputted by said specific reading part with the image data of the skin of said copy.

7. The image reading device according to claim 4, wherein said noise eliminating part removes the noises from the image data outputted by said specific reading part retroactively to a specific period from a moment when the image data is determined to contain said noises.

8. The image reading device according to claim 4, wherein the noise eliminating part applies the same process as that of said specific eliminating part in the sub-scanning direction with a plurality of lines in succession even after the noises are determined to be contained.

9. The image reading device according to claim 4, wherein the noise eliminating part applies the same process as that of said specific eliminating part to a plurality of adjoining pixels in the main scanning direction of the pixels that are determined to contain the noises.

10. The image reading device according to claim 1, further comprising a reading position moving part that moves a reading position of a copy by said reading part, when said noise detecting part determines that the image data outputted by a specific reading part among said plurality of the remaining parts contains the streaky noises.

11. The image reading device according to claim 10, wherein said reading position moving part moves the reading position of the copy by said reading part, during a period from the end of a copy reading operation in which the image data is determined to contain the streaky noises until the start of a next copy reading operation.

12. The image reading device according to claim 10, wherein said noise detecting part has a storage part that memorizes the positions of pixels including said noises, and outputs a control signal that prohibits the reading operation of the copy, after said reading position moving part moves the reading position, when the image data outputted by said specific reading part is again determined to contain the streaky noises as to the same pixels as the pixels stored by said storage part.

13. The image reading device according to claim 1, wherein the plurality of reading parts include three or more reading parts that read the copy fed by the feeding part, and the image reading device further comprising an output image data generation part that selects the image data obtained from a specific reading part as output image data when the noise detecting part detects that the image data are coincident with each other, selects image data obtained from two image reading parts with the least difference between them, when the noise detecting part detects that the image data are not coincident as to a plurality of pixels arrayed in the sub-scanning direction in succession between two or more reading parts, and generates the output image data from these image data.

14. The image reading device according to claim 1, further comprising:
   a noise eliminating part that conducts, on the basis of the determination result by said noise detecting part, noise eliminating processing to the image data read by a reading part selected as the reading part for generating output images among said plurality of reading parts,
   a noise quantity measuring part that measures, on the basis of the determination result by said noise detecting part, the quantity of noise for one main scanning line as to each of said plurality of reading parts, and a switch part that switches the reading part for generating output images into a reading part having the smallest quantity of noises measured by said noise quantity measuring part.

15. The image reading device according to claim 1, further comprising a setting part that sets said specific number of pixels to a larger value, as the feeding speed of the copy fed by said feeding part becomes faster.

16. The image reading device according to claim 1, further comprising a setting part that sets said specific number of pixels on the basis of the number of pixels of the noises produced when the feeding speed of the copy fed by said feeding part is fast.

17. The image reading device according to claim 1, further comprising a setting part that sets said specific number of pixels on the basis of the amount of the phase shift of the outputted image data in said plurality of reading parts, which is created when the feeding speed of the copy fed by said feeding part is fast.

18. An image reading device, comprising:
   a feeding part that is adapted to feed a copy at a plurality of feeding speeds, three or more reading parts disposed along a feeding path of the copy to read the copy fed by said feeding part, and
   an image selecting part that compares image data obtained from each of said reading parts, selects the image data obtained from a specific reading part as output image data when the image data is coincident with each other, conducts the majority operation among the image data obtained from said reading parts as to a plurality of pixels arrayed in the sub-scanning direction, when inconsistencies of the image data are generated in succession between two or more reading parts, and selects one item of the image data belonging to the majority side as the output image data regardless of the feeding speed.

19. An image reading method, comprising the steps of:
reading, by a plurality of reading parts, a copy fed by a feeding part that is adapted to feed the copy at a plurality of feeding speeds,
comparing image data outputted by said plurality of reading parts regardless of the feeding speed, and
determining the image data outputted by a specific reading part of said plurality of reading parts contains streaky noises, when the image data items are not coincident in succession as to a plurality of pixels arrayed in the sub-scanning direction.

* * * * *